United States Patent [19]
Sato et al.

[11] Patent Number: 5,712,652
[45] Date of Patent: Jan. 27, 1998

[54] LIQUID CRYSTAL DISPLAY DEVICE

[75] Inventors: Hajime Sato, Yokohama; Shuichiro Ishizawa, Kamakura; Nozomu Harada, Yokohama; Kiyofumi Ochii, Koganei; Shigeyuki Hayakawa, Chigasaki; Yoshiro Aoki, Yokohama, all of Japan

[73] Assignee: Kabushiki Kaisha Toshiba, Kawasaki, Japan

[21] Appl. No.: 602,599

[22] Filed: Feb. 16, 1996

[30] Foreign Application Priority Data

| Feb. 16, 1995 | [JP] | Japan | 7-027800 |
| Feb. 16, 1995 | [JP] | Japan | 7-027801 |
| Feb. 2, 1996 | [JP] | Japan | 8-040703 |

[51] Int. Cl.$^6$ .................................................. G09G 3/36
[52] U.S. Cl. .................... 345/90; 345/30; 345/55; 345/98; 345/204; 349/19; 349/33; 349/41
[58] Field of Search .................. 345/30, 55, 87, 345/90, 96, 98, 204; 349/1, 19, 33, 41, 143

[56] References Cited

U.S. PATENT DOCUMENTS

| 4,651,149 | 3/1987 | Takeda et al. | 340/805 |
| 5,373,378 | 12/1994 | Takubo et al. | 359/59 |
| 5,416,620 | 5/1995 | Osugi | 359/72 |
| 5,471,225 | 11/1995 | Parks | 345/98 |
| 5,523,776 | 6/1996 | Hougham et al. | 345/211 |
| 5,534,884 | 7/1996 | Mase et al. | 345/87 |

FOREIGN PATENT DOCUMENTS

| 58-23091 | 2/1983 | Japan . |
| 58-196582 | 11/1983 | Japan . |
| 6-102530 | 4/1994 | Japan . |

*Primary Examiner*—Kee M. Tung
*Assistant Examiner*—Vincent E. Kovalick
*Attorney, Agent, or Firm*—Cushman Darby & Cushman IP Group of Pillsbury Madison & Sutro LLP

[57] ABSTRACT

A liquid crystal display device of low power consumption is disclosed, which is suitable for use with a portable data processing apparatus, in particular. The liquid crystal display device, comprises: a switch element array substrate (301) having a plurality of data lines (1) and a plurality of scanning lines (2) both arranged being intersected to each other in a matrix form so as to form matrix intersection points; a plurality of pixel electrodes (3) each arranged for each matrix intersection point; and a plurality of first switching elements (6, 7) each arranged for each matrix intersection point and each turned on or off by the scanning line, for applying write voltage supplied from the data line to the pixel electrode, respectively when turned on; a counter substrate (314) having a plurality of counter electrodes (12) each arranged being opposed to each pixel electrode with a gap between the two; a liquid crystal layer (13) sandwiched between the switching element array substrate and the counter substrate; a plurality of memory elements (100) each interposed between the corresponding first switching element and the corresponding pixel electrode, for holding the write voltage supplied through the data line as data, when the first switching element is turned on; a plurality of display control lines (8, 10) each arranged in correspondence to each scanning line; and a plurality of second switching elements (9, 11) each arranged for each matrix intersection point, for controlling connection between the pixel electrode and the display control line on the basis of output of the memory element.

18 Claims, 21 Drawing Sheets

WHITE DISPLAY WHEN NODE (31) SIDE IS HIGH (IN NORMALLY WHITE MODE)

BLACK DISPLAY WHEN NODE (31) SIDE IS HIGH (IN NORMALLY WHITE MODE)

FULL SIZE DISPLAY
(ASPECT RATIO = 4:3)

VISTA SIZE DISPLAY
(ASPECT RATIO = 16:9)

LIQUID CRYSTAL DISPLAY DEVICE

BACKGROUND OF THE INVENTION

The present invention relates to a liquid crystal display device, and more specifically to a liquid crystal display device for displaying high definition pictures under a low power consumption, which is suitable for use as a display device for a small-sized data terminal such as a portable personal computer.

The liquid crystal display device has been widely used as a picture display device of various data processing apparatus or of a portable or wall-mounted television set, as a favorable display device replaceable with a cathode ray tube (CRT). Recently, in particular, the liquid crystal display device has been noticed as a thin and light-weight display devices, and therefore widely used with the portable data processing apparatus such as notebook type personal computers.

In the various liquid crystal display devices as described above, in particular, so-called active-matrix liquid crystal display device has been researched and developed energetically. In the active matrix liquid crystal display device, thin film transistors (simply referred to as TFT, hereinafter) formed of polycrystalline silicon (simply referred to as poly-Si, hereinafter) are arranged as switching elements for constituting both pixel portions and a liquid crystal drive circuit formed at the peripheral edge portion of a switching element array substrate.

Here, the construction and the operation of the prior art liquid crystal display device, in particular of the active matrix liquid crystal display layer will be simply described hereinbelow, with reference to the attached drawings.

FIG. 19 is a circuit diagram showing the construction of the typical prior art liquid crystal display device. As shown, the major part of the prior art liquid crystal display device is roughly composed of a switching element array substrate 906, a counter substrate (not shown) arranged being opposed to the array substrate 906, a liquid crystal layer (not shown), a data driver 909, and a scan driver 910. The switching element array substrate 906 is made up of a plurality of data lines 901 and scanning lines 902 both arranged being intersected to each other in a matrix form, a plurality of pixel electrodes 903, a plurality of pixel portion switching elements 904 each connected between the pixel electrode 903 and the data line 901 and controlled by the scanning line 902, and a plurality of storage capacitors 905 each having one end connected to a rear stage of each pixel portion switching element 904 and to a front stage of each pixel electrode 903 and the other end grounded. The opposing substrate is provided so as to be opposed to the switching element array substrate 906 in such a way that a gap is formed between the pixel electrode 903 and the counter electrode 907, respectively. The liquid crystal layer is formed between the switching element array substrate 906 and the opposing substrate being encapsulated at the peripheral edge portions of these two substrates in such a way as to form a plurality of liquid crystal capacitances 908, respectively. The data driver 909 drives the data lines 901, and the scan driver 910 drives the scanning lines 902, respectively.

As the liquid crystal drive circuit system of the prior art liquid crystal display device, in general, a liquid crystal driver IC of shift register type is used being attached to the outside of the display device. Or else, a so-called integral type liquid crystal display device formed integral with liquid crystal drive circuit has been proposed, in which the poly-Si TFTs are directly formed on the same substrate so as to be used for both the pixel switching elements 904 and the liquid crystal drive circuit system.

In operation, whenever a scanning line 902 is selected by the scan driver circuit 910, the pixel portion switching elements 904 connected to the selected scanning line 902 are set to a conductive state.

At the same time, the data line 901 corresponding to the video data is selected by the data driver circuit 909, so that a voltage corresponding to picture data (e.g., a video signal) is applied to the data line 901.

Therefore, the voltage is supplied from the data line 901 to the storage capacitance 905 via the pixel portion switching element 904 connected between the selected scanning line 902 and the selected data line 901, to charge the storage capacitance 905. At the same time, the voltage is written in the pixel electrode 903 connected to the storage capacitance 905. Then, the liquid crystal layer, that is, the liquid crystal cell (liquid crystal capacitance) 908 is light-modulated according to the applied voltage, with the result that an image can be displayed.

During one horizontal scanning period, the data lines 901 are selected in sequence by the data driver 909 beginning from the rightmost end or the leftmost end of the data lines 901 to the opposite end. On the other hand, on the side of the scanning lines 902, after video signals have been written in all the data lines 901 along one row of the scanning line 902, the succeeding scanning line 902 is selected. As described above, when the scanning lines are selected in sequence from above or from below in the vertical direction and thereby the selected scanning line reaches the vertical end, the scanning operation is repeated again by returning to the first scanning line. By repeating the above-mentioned scanning operation in sequence, images are selected and displayed on the entire screen of the liquid crystal display device, with the result that one frame (or one field) picture can be formed for each horizontal scanning period.

The most advantage of the above-mentioned liquid crystal display device is that the display device can be formed thin in thickness and light in weight, as already explained. Therefore, the liquid crystal display device provided with the above-mentioned advantage has been so far used as a display device mountable on a portable data processing apparatus such as a note book type personal computer.

In the portable data processing apparatus such as a note book type personal computer, since a battery drive method must be adopted usually, in the present situation, the serviceable time of the portable processing apparatus after a single battery charge is determined on the basis of the power capacitance of the battery, and thereby limited in dependence upon the power capacitance of the battery.

To overcome this problem, various methods have been so far tried in order to increase the continuous operating time determined by one battery charge. In this case, it is an important problem to reduce the power consumption of the liquid crystal display device, without saying that the power capacitance of the battery itself must be increased.

Recently, in particular, since the portable display device is a necessary condition, the power capacitance of the battery must be increased without increasing the battery weight. In the field of the usual battery, however, the improvement of the power capacity density (capacitance per weight) of the battery reaches a technical limit, the situation is such that it is difficult in practice to improve the battery power capacity density markedly. As a result, the reduction of the power consumption of the liquid crystal display device is one of the important problems to be solved.

In order to reduce the lower power consumption of the liquid crystal display, two methods can be considered. One method is to reduce the power for supplying illumination light. This is because the liquid crystal display device is of non-light emitting device, so that the illumination light is inevitably required.

In the preset situation of the prior art liquid crystal display device using a back light, however, the improvements of both the back light emitting efficiency and the back light availability efficiency reach their limits. In addition, in the active matrix type liquid crystal display device using TFTs, since there exists such a tendency that the aperture ratio of the pixel portion decreases with increasing number of pixels for realizing a higher picture density, there exists a problem in that it is difficult to reduce the power consumption of the back light.

The second method is to reduce the power consumption of the liquid crystal display device itself, that is, to reduce the driving power required to display picture on the liquid crystal panel.

In the prior art liquid crystal display device, however, it is very difficult to markedly reduce the driving power of the display device. This is because the prior art liquid crystal display device adopts such a driving method as to be referred to as dynamic drive type. In more detail, in the prior art liquid crystal display device, as shown in FIG. 19, the signal voltage of liquid crystal cell 908 is applied through the data line 901 to the pixel electrode 903, and the storage capacitance 905.

Therefore, during one field period in which the potential of the succeeding data line 901 is being written in the liquid capacitance 908 of one pixel, current leaks from both the liquid crystal cell 908 and the storage capacitance 905 of the pixel, so that the potential charged by the liquid capacitance 908 drops, thus causing a deterioration of display quality such that the display brightness and the display contrast are reduced.

As a result, in order to maintain a high display quality, even in the display of a still picture, it is necessary to hold the potential by always driving both the data driver 909 and the scan driver 910, that is, by continuing to write the voltage (video signal) in each pixel. In other words, the circuit including the liquid crystal capacitance, the storage capacitance and the pixel portion switching elements must be always refreshed as with the case of a dynamic RAM; that is, power is required to always drive the liquid crystal drive circuit system and to refresh the pixel section. This is extremely disadvantageous from the standpoint of power consumption. In other words, in the prior art liquid crystal display device, there exists a problem in that the driving method thereof runs counter to the reduction of the power consumption.

To overcome the above-mentioned problem, a static type liquid crystal display device formed with a digital memory cell arranged in each pixel has been proposed, as the liquid crystal display device which can reduce the power consumption. In general, this static type liquid crystal display device having a digital memory cell in the pixel is provided with the following advantages:

(1) Since video signals inputted externally can be held during the still picture display, the power consumption can be reduced to that extent.

(2) Since the pixel voltages can be digitalized, the display quality does not easily deteriorate by cross-talk, for instance.

On the other hand, however, in the structure of this static type liquid crystal display device, since the digital memory is formed by combining a plurality of switching elements (e.g., thin film transistors (TFT)) for each pixel, the structure thereof is extremely complicated, when compared with the dynamic type liquid crystal display device in which only a single TFT is used as the pixel portion switching element for each pixel, with the result that there exists a problem in that the manufacturing yield thereof is inevitably lowered.

Further, in the recent liquid crystal display device used for the portable data processing apparatus in which the number of pixels has been increased more and more for a higher definition, the structure of each pixel portion is complicated and thereby the manufacturing process thereof is further complicated due to the advanced micro-miniaturization technique of the pixels. As a result, according to circumferences, there exists a problem in that the circuit structure including the digital memory cannot be formed within a single pixel region. In other words, there exists such a problem that the above-mentioned prior structure cannot be adopted in practice. Or else, since a large area is occupied by the complicated circuit structure in each pixel portion, the remaining area is small, so that only a small pixel aperture portion can be formed, thus causing another problem in that the picture brightness is lowered. Or else, in order to obtain a predetermined high brightness in a narrow aperture area, the power required for illumination (back light) must be increased, thus causing a problem in that this method goes against the reduction of the power consumption.

The above-mentioned static type liquid crystal display device provided with a digital memory cell in each pixel is disclosed in Japanese Patent Laid-open Publication (Kokai) 58-23091, for instance.

FIG. 20 shows a first example of the prior art static type liquid crystal display device, and FIG. 21 shows a second example of the prior art static type liquid crystal display device, respectively.

In these examples, the display device comprises, for each pixel, a pixel portion switching element 904 connected to each data line 901 and controlled by each scanning line 902, a digital memory cell 911, and an additional circuit 912 for inverting the polarity of the applied voltage at a predetermined timing to drive each liquid crystal cell (i.e., liquid crystal capacitance) 908 of each pixel alternately in ac driving manner.

The basic operation of this display device is to latch a video signal applied from the data line 901 by the digital memory cell 911 and to write the latched video signal in the liquid crystal cell (i.e., liquid crystal capacitance) 908 of each pixel.

Here, since the digital memory cell 911 holds the preceding video signal until the new succeeding video signal is written, once the video signal has been written, even if the data driver 909 and the scan driver 910 are both stopped, the written image can be kept displayed as a still image. Therefore, it is possible to realize a lower power consumption when a still picture is displayed by the liquid crystal display device.

Further, in the case of the first prior art display device shown in FIG. 20, an exclusive NOR circuit is used as the additional circuit 912. In the case of the second prior art display device shown in FIG. 21, a transfer gate (to which an ac signal is selectively applied from the outside for each pixel) is used as the additional circuit 912.

By the way, as already explained, the liquid crystal display device is usually driven alternately, that is, in an ac driving manner. This is because when a dc voltage is kept applied to the liquid crystal cell, the characteristics of the liquid crystal display inevitably deteriorates because the dielectric polarization occurs. In the above-mentioned two prior art examples, the liquid crystal cell is driven in an ac manner by applying a two-phase clock signal to both the pixel electrode and the counter electrode.

In the above-mentioned prior art liquid crystal display devices as described above, however, the drive circuit system is formed on the assumption that the counter electrode is driven alternately. In this case, however, since the counter electrodes are arranged being opposed to all the pixel electrodes in common via a liquid crystal layer so as to form the liquid crystal capacitance, the respective counter electrode has a large electrical capacitance component. Therefore, a drive circuit system of a large driving capability (or a large driving capacitance) is required to charge and discharge the large electric capacitance during the ac driving operation. As a result, a large current is consumed to charge and discharge the large electric capacitance.

In the case of the liquid crystal display device using a liquid crystal driver IC mounted externally as the drive circuit, as far as the liquid crystal driver IC provided with a large capacitance is selected so as to cope with the large electric capacitance required to drive the counter electrodes alternately, it is possible to adopt the prior art method of ac-driving the counter electrode alternately. However, when the entire liquid crystal display device including the driving circuit system is required to reduce the size and the power consumption, it is preferable that the driving circuit system is formed on the same TFT array substrate integral with the pixel portion switching TFTs and the pixel electrodes. In this case, when the liquid crystal driver circuit of large driving capability is formed on the same substrate by use of the thin transistor structure, since the element area increases with increasing electric capacitance required to drive the counter electrodes alternately, there arises a problem in that the liquid crystal driver circuit occupies a large area from physical standpoint. In addition, there exists another problem in that the manufacturing process of the liquid crystal driver circuit of a large capacitance is inevitably complicated, and thereby the production yield is lowered and further the product reliability deteriorates.

Further, in the above-mentioned prior art liquid crystal display device, the power consumption can be reduced markedly owing to the static operation during the still picture display. However, in the case to display a less-motional picture, for example twinkle of a cursor, there exists a problem in that the power consumption is the same as that of the dynamic operation for displaying the ordinary motion picture.

Further, in the case of the prior art structure, although the ac signal can be inputted for each pixel, it is impossible to use the prior art structure, as it is, as an input device. In more detail, when a signal input function using a pen device is further required for the prior art structure in addition to the display function, a pressure sensitive sheet or a sensor plate must be placed in or over the liquid crystal cells, so that the cell thickness inevitably increases. This is not only disadvantageous when the liquid crystal device provided with the external signal input function is mounted on the portable apparatus, but also arises another problem in that the number of elements increases.

SUMMARY OF THE INVENTION

Accordingly, the first object of the present invention is to provide a liquid crystal display device which can reduce the power consumption for ac-driving the liquid crystal cells.

Further, the second object of the present invention is to provide a liquid crystal display device which can reduce the size of the liquid crystal driver circuit for ac-driving the liquid crystal cells, for realization of the total size reduction of the entire liquid crystal display device.

Further, the third object of the present invention is to provide a liquid crystal display device which can reduce the power consumption, without driving all the pixels of the entire picture when a still picture or a less-motion picture is being displayed.

Further, the fourth object of the present invention is to provide a liquid crystal display device which is provided with an additional external signal input function as a liquid crystal display device unit, without increasing the cell thickness.

Further, the fifth object of the present invention is to provide a liquid crystal display device which is simple in structure and thereby in the manufacturing process, high in the display density, and therefore suitable for the portable data processing apparatus such as note book type personal computer.

According to the first aspect of the invention, there is provided a liquid crystal display device, comprising:

a switch element array substrate having a plurality of data lines and a plurality of scanning lines both arranged being intersected to each other in a matrix form so as to form matrix intersection points of the scanning lines and the data lines; a plurality of pixel electrodes each arranged for each matrix intersection point; and a plurality of first switching elements each arranged for each matrix intersection point and each turned on or off by the scanning line, for applying write voltage supplied from the data line to the pixel electrode, respectively when turned on;

a counter substrate having a plurality of counter electrodes each arranged being opposed to each pixel electrode with a gap between the two;

a liquid crystal layer sandwiched between the switching element array substrate and the opposing substrate;

a plurality of memory elements each interposed between the corresponding first switching element and the corresponding pixel electrode, for holding the write voltage supplied through the data line as data, when the first switching element is turned on;

a plurality of display control lines each arranged in correspondence to each scanning line; and a plurality of second switching elements each arranged for each matrix intersection point, for controlling connection between the pixel electrode and the display control line on the basis of output of the memory element.

By employing this aspect of the present invention, since the liquid crystal display device is provided with, for each pixel, a memory cell and a switching element for controlling the connection between a display control line and the pixel according to change in the content of the memory cell, a constant voltage can be used for a specific display, so that the power consumption can be reduced, in particular during the still picture display, thus providing a liquid crystal display device suitable for the portable data processing apparatus. Further, it is possible to easily realize the liquid crystal display device of a high display quality, of an excellent reliability, and of a high production yield.

The size of the liquid crystal display device of the above-mentioned structure can be effectively reduced by adopting the reflective type cell structure and by forming the driving circuit integral with the pixel portion switching elements.

Further, when the address changes of the data lines and the scanning lines are detected and further the frequency of the ac driving signal is reduced in the case where the address changes thereof are not detected, it is possible to further reduce according to consumption.

According to the second aspect of the present invention, there is provided a liquid crystal display device, comprising:

a switch element array substrate having a plurality of data lines and a plurality of scanning lines both arranged being intersected to each other in a matrix form so as to form matrix intersection points; a plurality of pixel electrodes each arranged for each matrix intersection point; a plurality of switching elements each arranged for each matrix intersection point and each turned on or off by the scanning line, for applying write voltage supplied from the data line to the pixel electrode, respectively when turned on; and a data line driving circuit and a scanning line driving circuit each for selectively supplying a voltage to the data line and the scanning line, respectively, to drive the selected pixel electrode via the switching element;

a counter substrate having a plurality of counter electrodes each arranged being opposed to each pixel electrode with a gap between the two;

a liquid crystal layer sandwiched between the switching element array substrate and the opposing substrate;

a plurality of memory elements each interposed between the corresponding switching element and the corresponding pixel electrode, for holding the write voltage supplied through the data line as data, when the switching element is turned on;

polarity inverting means for controlling connection with the pixel electrode on the basis of output of the memory element; and a decoder circuit included in at least one of the data line driving circuit and the scanning line driving circuit, for selecting at least one of the data line and the scanning line on the basis of a combination of numerical signals.

By employing this aspect of the present invention, since the memory cell is provided for each pixel and further since a decoder circuit is used to select each pixel, it is possible to access any pixels quickly for control of the display of the pixels.

According to the third aspect of the present invention, there is provided a liquid crystal display device, comprising:

a switch element array substrate having a plurality of data lines and a plurality of scanning lines both arranged being intersected to each other in a matrix form so as to form matrix intersection points; a plurality of pixel electrodes each arranged for each matrix intersection point; and a plurality of first switching elements each arranged for each matrix intersection point and each turned on or off by the scanning line, for applying write voltage supplied from the data line to the pixel electrode, respectively when turned on;

a counter substrate having a plurality of counter electrodes each arranged being opposed to each pixel electrode with a gap between the two;

a liquid crystal layer sandwiched between the switching element array substrate and the opposing substrate;

a plurality of memory elements each interposed between the corresponding first switching element and the corresponding pixel electrode, for holding the write voltage supplied through the data line as data, when the first switching element is turned on;

a plurality of display control lines each arranged in correspondence to each scanning line;

a plurality of second switching elements each arranged for each matrix intersection point, for controlling connection between the pixel electrode and the display control line on the basis of output of the memory element; and a plurality of photoelectric transfer elements each one end terminal of which is connected to an input side of the memory element.

By employing this aspect of the present invention, since comparing means for comparing the data obtained by the input circuit with the data written in the memory cell is provided, it is possible to know the position at which the input changes, so that it is possible to use the display device as an external signal input device simultaneously.

DETAILED DESCRIPTION OF THE EMBODIMENTS

The embodiments of the liquid crystal display device according to the present invention will be described hereinbelow with reference to the attached drawings.

Figure 1:
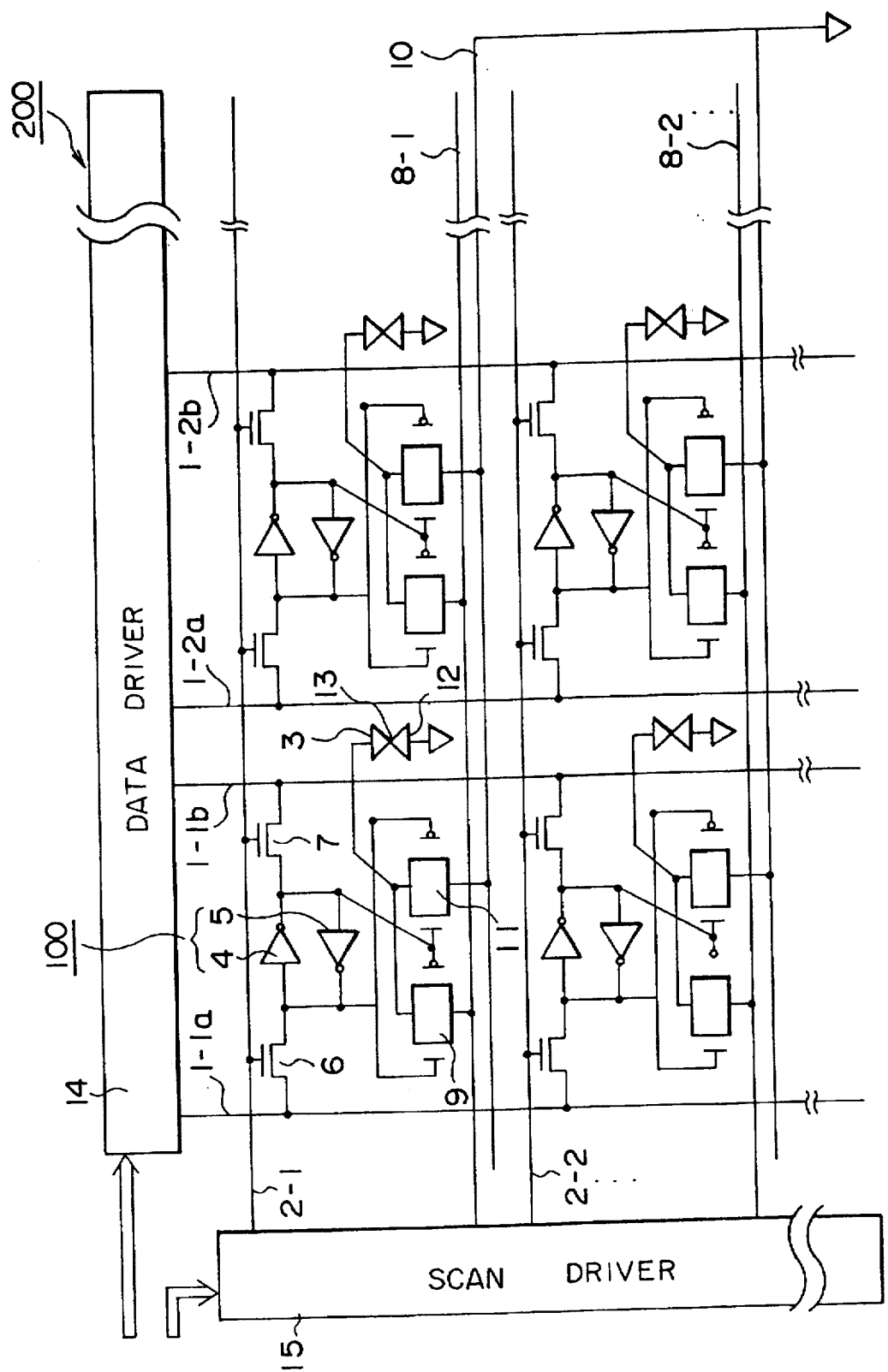
FIG. 1 is a circuit diagram showing a first embodiment of the liquid crystal display device according to the present invention.

FIG. 1 is an equivalent circuit diagram showing the construction of the first embodiment of the liquid crystal display device according to the present invention.

In FIG. 1, a plurality of data line pairs 1 (1-1a, 1-1b; 1-2a, 1-2b; ...) and a plurality of scanning lines 2 (2-1, 2-2, ...) are arranged being intersected to each other in a matrix form. Each intersection point of the formed matrix corresponds to each pixel region. Further, a pixel electrode 3 is formed for each intersection point so as to form a pixel. Further, in FIG. 1, the pixel electrode itself 3 is not shown, but an upper electrode (terminal) of each liquid crystal cell is shown equivalently. The major part of the liquid crystal display device according to the present invention is composed, for each pixel of each intersection point region, of a digital memory cell 100, two n-channel MOS (referred to as nMOS, hereinafter) structure TFTs (thin film transistor) 6 and 7, a first complementary MOS (referred to as CMOS, hereinafter) transfer gate 9, a second CMOS transfer gate 11, and a liquid crystal cell 13. The digital memory cell 100 is formed by connecting two inverter elements 4 and 5 into a loop shape. The two nMOS structure TFTs 6 and 7 are connected between two adjacent data lines 1-na, 1-nb; ...; (n: a natural number indicative of the number of data line columns) (e.g., 1-1a, 1-1b; ...;) and the digital memory cell 100, respectively. The CMOS transfer gate 9 is connected between an ac drive signal line 8 (8-1, 8-2, ...) and the pixel electrode 3, and has a gate connected to one end of the digital memory cell 100. The output of the first transfer gate 9 controls the pixel electrode 3 by turning on or off the voltage of the ac drive signal line 8. The CMOS transfer gate 11 is connected between a reset signal line 10 and the pixel electrode 3, and has a gate connected to the other opposite end of the digital memory cell 100. The output of the second transfer gate 10 controls the pixel electrode 3 by turning on or off the voltage of the reset signal line 10. The liquid crystal cell 13 is formed by a liquid crystal layer interposed between the pixel electrode 3 and the counter electrode 12.

Further, the counter electrode 12 and the reset signal line 10 are connected to a constant voltage supply circuit (not shown). Further, a data driver 14 and a scan driver 15 are formed on the peripheral edge portion of a TFT array substrate 200 together with the respective TFTs by use of at least one of materials used for forming the TFTs.

Figure 3:
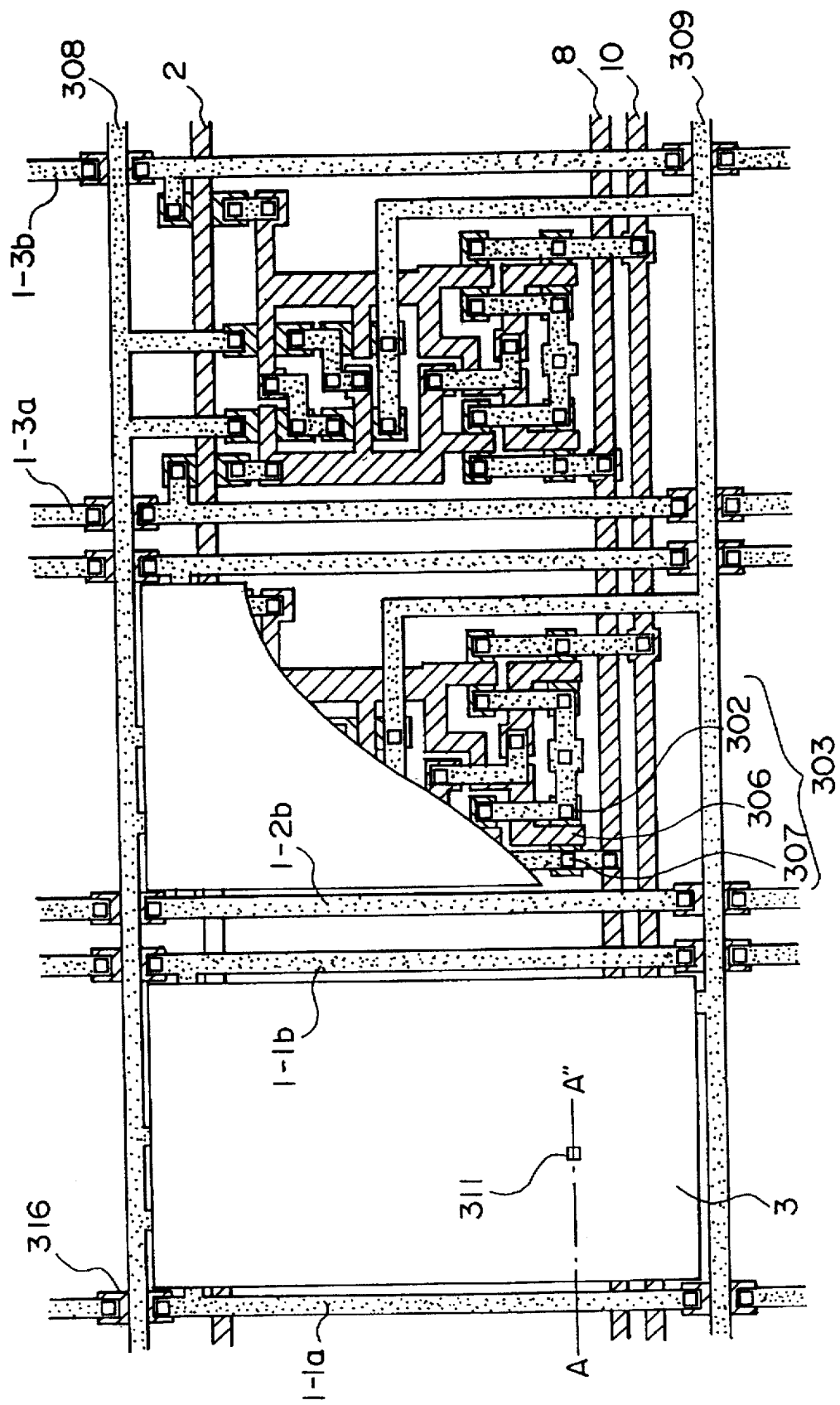
FIG. 3 is a plane view showing a practical circuit construction showing the pixel portions of the first embodiment of the liquid crystal display device according to the present invention.
Figure 4:
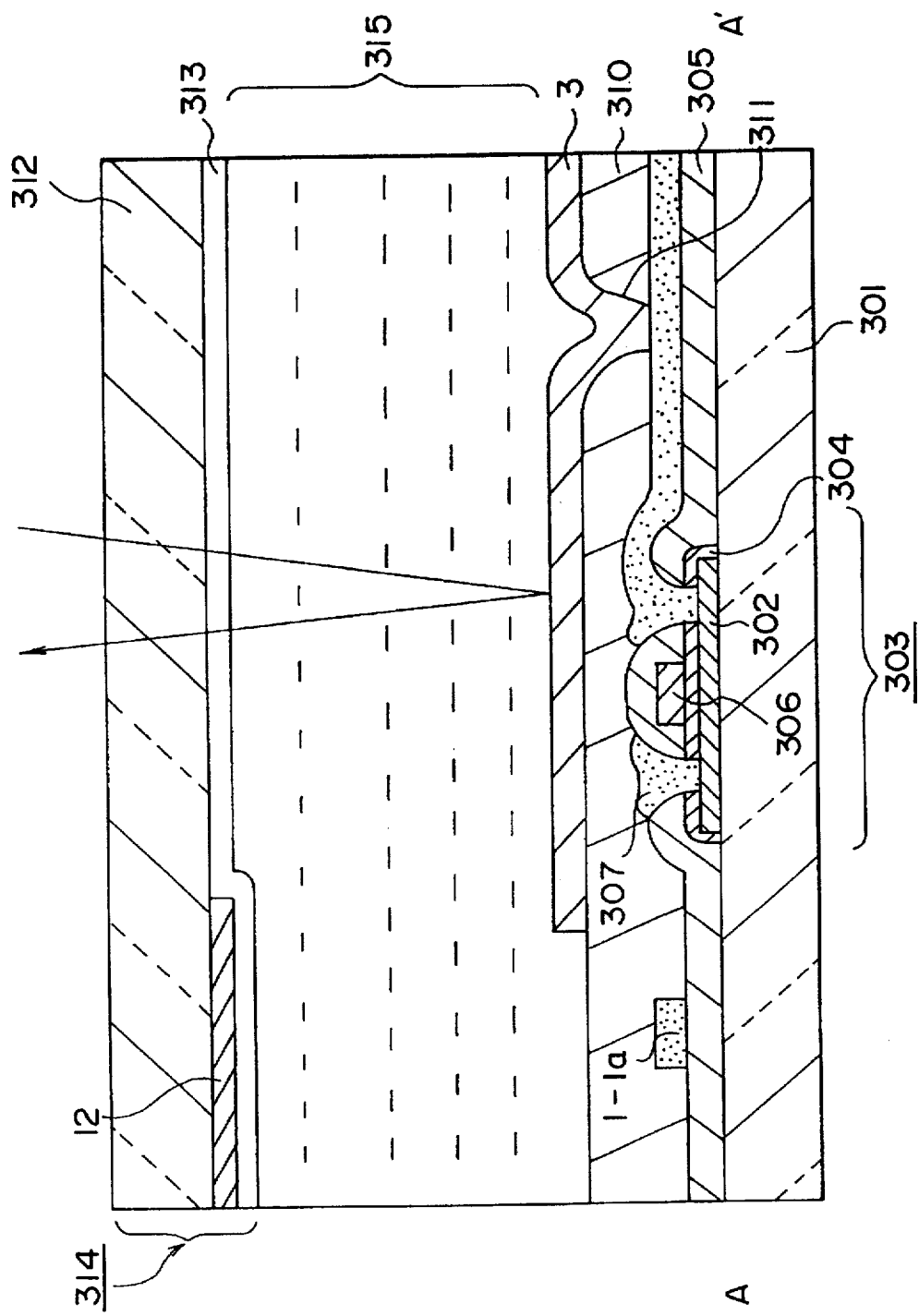
FIG. 4 is a cross-sectional view taken along the line A–A' in FIG. 3.

FIG. 3 is a plan view showing the practical circuit structure of the pixel portions of the liquid crystal display device according to the present invention, and FIG. 4 is a cross-sectional view taken along the line A-A' in FIG. 3.

With reference to FIGS. 3 and 4, on a glass substrate (electrical insulating substrate) 301, there are formed various TFTs 303 such as a pair of the two TFTs 6 and 7 used as the pixel portion switching elements, a pair of the TFTs 9 and 11 used as the two transfer gates, and the TFTs for constituting the digital memory cell 100, for each pixel by using a poly-Si film 302 as an active layer.

The poly-Si film 302 was formed by first forming an a-Si (amorphous silicon) thin film by use of a low pressure CVD system and then by annealing the formed film at 600° C. in a nitrogen atmosphere of an annealing furnace.

A gate insulating film 304 and a first interlayer insulating film 305 were formed of a $SiO_x$ (silicon oxide) film formed by use of an atmospheric pressure CVD system. Further, a gate electrode 306 was formed by use of a MoW film to reduce the resistance thereof.

Further, the data lines 1-1a, 1-1b (shown in FIGS. 1 and 3) were formed by extending a MoW film 316 from an intersection point with the voltage supply line 308. In this construction, although the wiring resistance of the entire data line 1 increases slightly, since the data signals are digital signals, there arises no practical problem with respect to the wiring characteristics.

The ac drive signal line 8 and the reset signal line 10 were both formed by arranging a MoW film roughly in parallel to the scanning line 2.

Further, the electrodes 307 such as source and drain electrodes were formed by use of an Aluminum film. A voltage supply line 308 and a ground line 309 were formed by use of an Aluminum film in order to reduce the resistance thereof to a smallest possible value within the range where the resistance reduction did not exert harmful influence upon the process consistency.

Further, the respective wiring lines for the digital memory cell 100 and the ac drive signal line 8 were covered with a second interlayer insulating film 310 to secure the electric insulating characteristics. Further, an aluminum film was formed on this second interlayer insulating film to obtain a reflective type pixel electrode 3.

The second interlayer insulating film 310 was formed by two-layer structure composed of a $SiO_x$ (silicon oxide) film formed by use of an atmospheric pressure CVD system and a $SiN_x$ (silicon nitride) film formed by use of a plasma CVD system.

The pixel electrodes 3 and the circuit elements such as the digital memory cells 100, etc. formed for each pixel portion are all connected to each other electrically through contact holes 311, respectively.

On the other hand, on the second glass substrate 312, two counter electrodes 12 formed of a transparent conductive film (e.g., ITO:Indium Tin Oxide) was formed. Further, an aligning film 313 was formed so as to cover all over the surface of the glass substrate 312 including the counter electrodes 12. The major part of the opposing substrate 314 was formed as described above. Further, a liquid crystal composition 315 is sandwiched between these two substrates, and sealed at the peripheral edges thereof.

By the construction as described above, it is possible to form the liquid crystal display device as the so-called reflective type liquid crystal display device, in which light is allowed to be incident upon the display device from the side of the opposing substrate 314; the incident light is reflected by the pixel electrodes 3 and further light modulated through the liquid crystal cell 315 for each pixel; and the reflected and modulated light is introduced from the liquid crystal cell 315 to the outside of the opposing substrate 314. In this type, since the pixel electrode 3 can be formed on the circuit of the digital memory cell 100, it is possible to obtain a sufficiently broad effective area of the pixel electrode 3, without being influenced by the area occupied by the digital memory cells 100 and the wiring. In addition, since no back light is required, there exists such an excellent advantage for the portable liquid crystal display device that a bright picture display can be obtained in spite of a lower power consumption.

In the present invention, in order to further increase the above-mentioned effect such that the pixel electrode 3 can be used as the reflective electrode, a guest-host type liquid crystal which enables the light modulation without use of any polarizer was used as the liquid crystal composition. When the guest-host type liquid crystal is used and further the coloring matters mixed with the liquid crystal are changed in various ways, it is possible to realize a color liquid crystal, in addition to the black and white display, without use of any color filters. As described above, when the guest-host type liquid crystal is used, it is possible to eliminate the polarizer or a color filter, which has so far caused a large loss of the light transmissibility and thereby a reduction of the light availability.

The operation of the liquid crystal display device of this first embodiment according to the present embodiment will be described hereinbelow.

In this crystal display device, it is possible to use the sequential scanning drive mode, the partial scanning drive mode, and the still picture drive mode, separately and properly. In the sequential scanning drive mode, video signals are written all over the screen of the display device by the ordinary sequential line scanning, to display a motion picture. In the partial scanning drive mode, video signals are selectively rewritten on a part of the screen of the display device, to display a less-motion picture. In the still picture drive mode, the video signals are kept written, to display a still picture.

According to the present invention, it is possible to markedly reduce the power consumption in the partial scanning drive mode and the still picture drive mode, in particular. Here, in the liquid crystal display device according to the present invention, a video signal can be written in one pixel as follows:

First, the potential of the scanning line 2-n (n: a natural number indicative of the number of rows of the scanning lines) corresponding to the pixel to be written is raised to high level. Therefore, the two TFTs 6 and 7 connected between the two data lines 1-na and 1-nb of the n-th row which corresponds to the scanning line 2-n are both turned on.

Under these conditions, a video signal is transmitted through the two data lines 1-na and 1-nb. In this case, the video signals transmitted to the two data lines 1-na and 1-nb are mutually opposite in phase to each other. Under these conditions, the two video signals are written from the two data lines 1-na and 1-nb in the digital memory cell 100 composed of the two inverters elements 4 and 5. In this case, in order to enable the data to be written in the digital memory cell 100, it is necessary to increase the driving capability of the entire data line drive circuit system including the two TFTs 6 and 7 higher than that of the two inverter elements 4 and 5.

The two outputs of the digital memory cell 100 are connected to the two ends of the two transfer gates 9 and 11, respectively, so that the transfer gates 9 and 11 are selectively turned on by the outputs of the digital memory cell 100, respectively.

Figure 5:
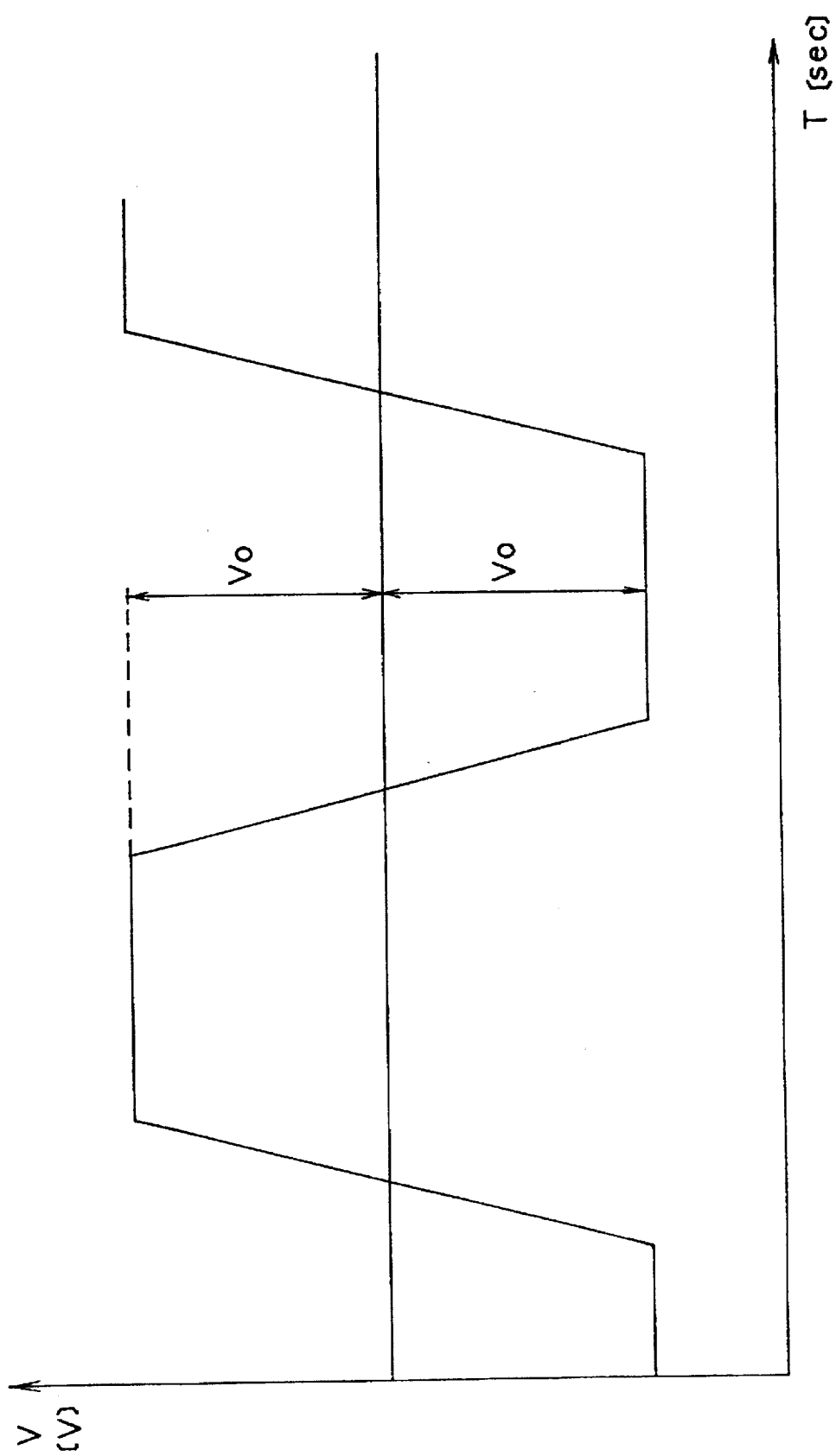
FIG. 5 is a waveform diagram showing a voltage applied to a counter electrode, an ac drive signal line, and a reset signal line in the first embodiment of the present invention.

FIG. 5 shows the waveform of the voltage applied to the counter electrode 12, the ac drive signal line 8, and the reset signal line 10, respectively. A constant voltage of a half of the voltage supplied by the voltage supply is applied to the counter electrode 12 and the reset signal line 10.

When the transfer gate 9 is selected, the ac drive signal is applied to the pixel electrode 3, so that the ac voltage of a peak value $V_0$ is applied to the liquid crystal cell 13. On the other hand, when the transfer gate 11 is selected, zero voltage is applied to the liquid crystal cell 13. The orientation of the liquid crystal molecules changes due to the presence or absence of electric field between liquid crystal cell 13, so that the brightness of the pixel changes for displaying an image.

One pixel is written in accordance with the above-mentioned operation. Further, in the sequential scanning mode, the above-mentioned operation is repeated all over the pixels of the picture screen by driving the data driver 14 from the left side to the right side, in sequence and the scan driver 15 from above to below, in sequence, so that video signals for one frame (or one field) can be written to display a picture. In the motion picture display, video signals are written in all the pixels with the sequential scanning mode.

In contrast with this, when the displayed picture change only partially (e.g., by use of a mouse pointer or a blinking cursor), the partial scanning mode is used.

In the partial scanning mode, video signals are written selectively only in the area at which the video signals must be rewritten on the picture screen. In the conventional dynamic drive type liquid crystal display device, since the pixel potential varies with the lapse of time due to the leak current of the pixel switch or the liquid crystal cell capacitance, it has been necessary to rewrite the video signal for each predetermined time period (e.g., for 1/60 sec) even if the data itself to be written is not changed. In the present invention, however, since the pixel potential is decided by the ac drive signal or the reset signal, without varying with the lapse of time, it is unnecessary to rewrite the data again with the lapse of time, as far as the data itself does not change.

Accordingly, when only a part of the displayed picture changes, only the data at the changing part are rewritten, so that it is possible to not only reduce the data transfer rate and but also to markedly reduce the power consumption.

Figure 2:
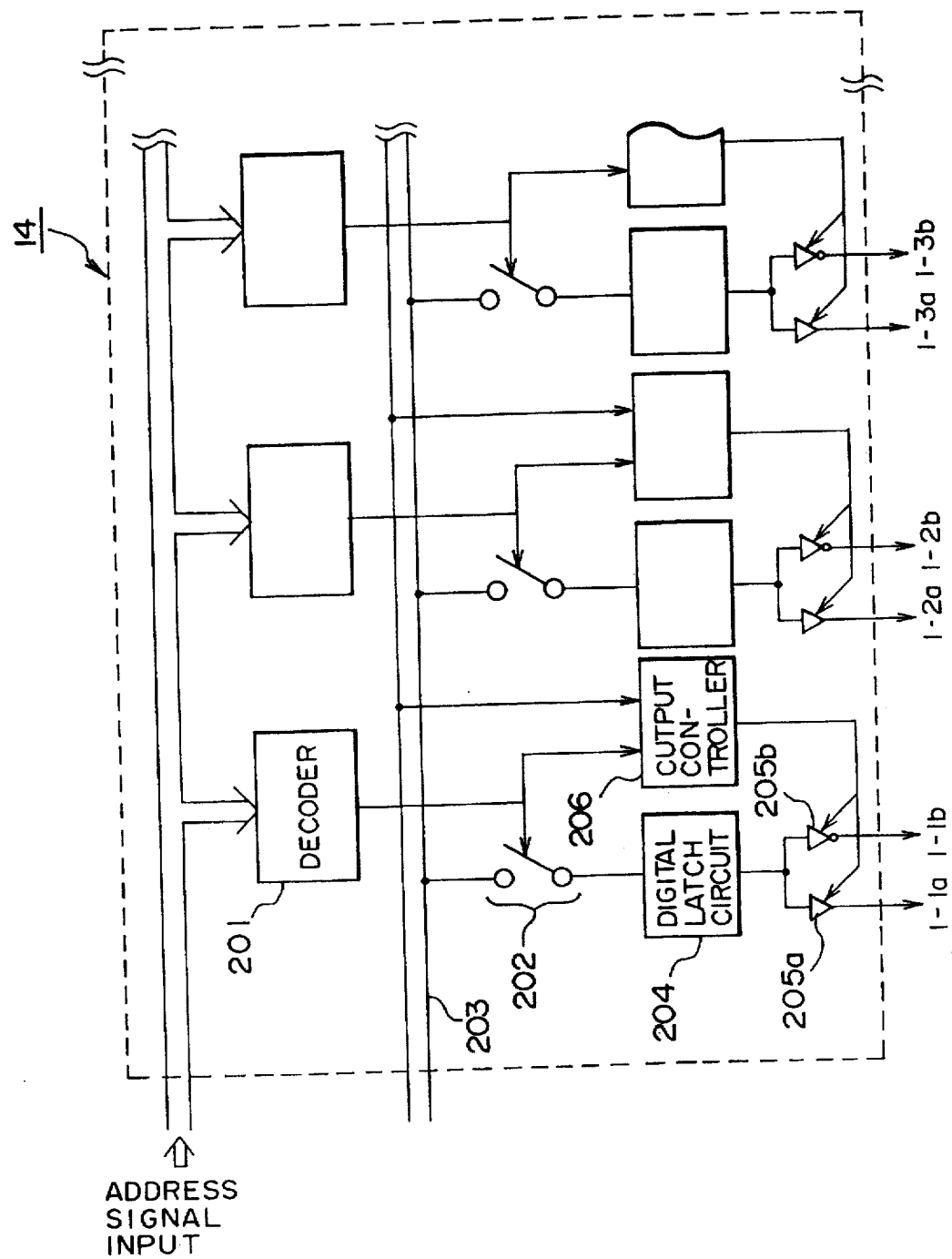
FIG. 2 is a circuit block diagram showing an example of a data driver and a scan driver of the first embodiment of the present invention.

FIG. 2 is an equivalent circuit diagram showing an example of the data driver 14 and the scan driver 15 which can both execute the partial scanning, in which a decoder type liquid crystal drive circuit system is shown. In the present invention, the decoder type liquid crystal drive circuit can be used to select the data lines and the scanning lines both corresponding to the pixels at which the voltages are required to be rewritten because images to be displayed change, that is, to write new data only in the specific pixels selectively.

As shown in FIG. 2, the data driver 14 is mainly composed of a decoder circuit 201 for inputting address signals, a switching element 202 controlled by the output of the decoder circuit 201, a digital latch circuit 204 connected to the video signal line 203 via the switch element 202, a buffer circuit (composed of two buffer circuits 205a and 205b) connected to the digital latch circuit 204, and an output control circuit 206 for controlling the output of the buffer circuits 205a and 205b.

When a specific bit is selected by the address signal, a video signal is inputted from the video signal line 203 to the digital latch circuit 204 via the switching element 202, and further outputted to the data lines 1-na and 1-nb through the buffer circuits 205a and 205b.

The output control circuit 206 activates only the buffer circuits 205a and 205b selected by the address signals, but holds the outputs of the non-selected buffer circuits 205a and 205b at a high impedance state, respectively. When the outputs of the two buffer circuits 205a and 205b are kept at a high impedance, even if the pixel portion TFTs 6 and 7 corresponding to the data lines 1-na and 1-nb to which the high impedance is applied are turned on, it is possible to keep the data held in the digital memory cell 100 unchanged.

In the still picture display, since the above-mentioned partial scanning is not required, the data driver 14 and the scan driver 15 are both stopped, and only the ac drive signal is inputted for display of a still picture (in the still picture mode).

In this case, as the frequency of the ac drive signal, 60 Hz used as the ordinary frame writing frequency can be also used. Or else, a frequency lower than the ordinary frame writing frequency can be used. Further, even if the frame writing frequency is determined 60 Hz, the power consumption can be reduced less than 1 mW in the case of the liquid crystal display device with a diagonal length of 6 inches. This value is 1/100 to 1/1000 of the power consumption of the conventional dynamic drive type liquid crystal display device, so that it can be understood that the power consumption can be reduced markedly.

Figure 6:
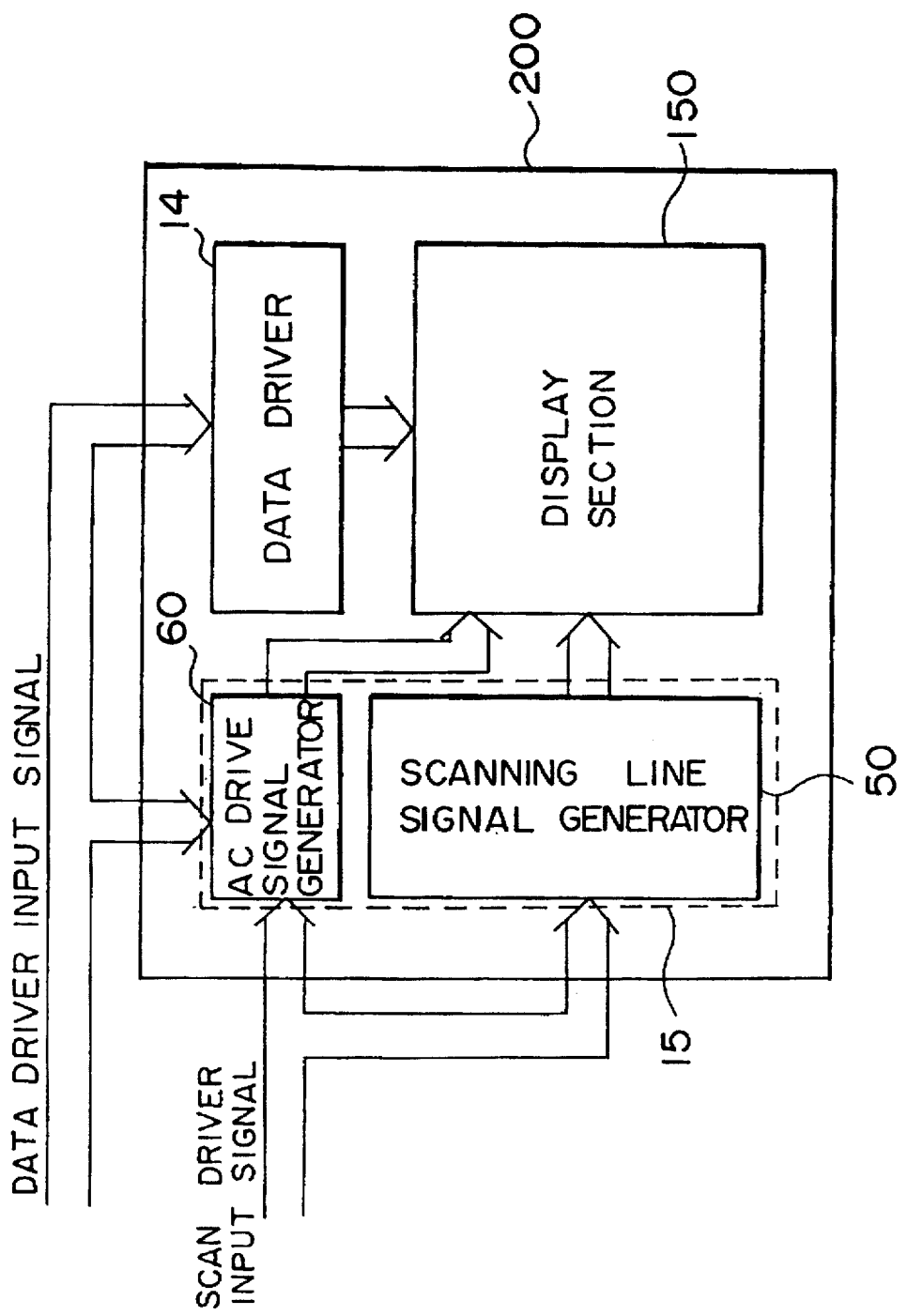
FIG. 6 is a schematic circuit block diagram showing a second embodiment of the liquid crystal display device according to the present invention, by which the ac drive frequency is dropped during the still picture display.
Figure 7:
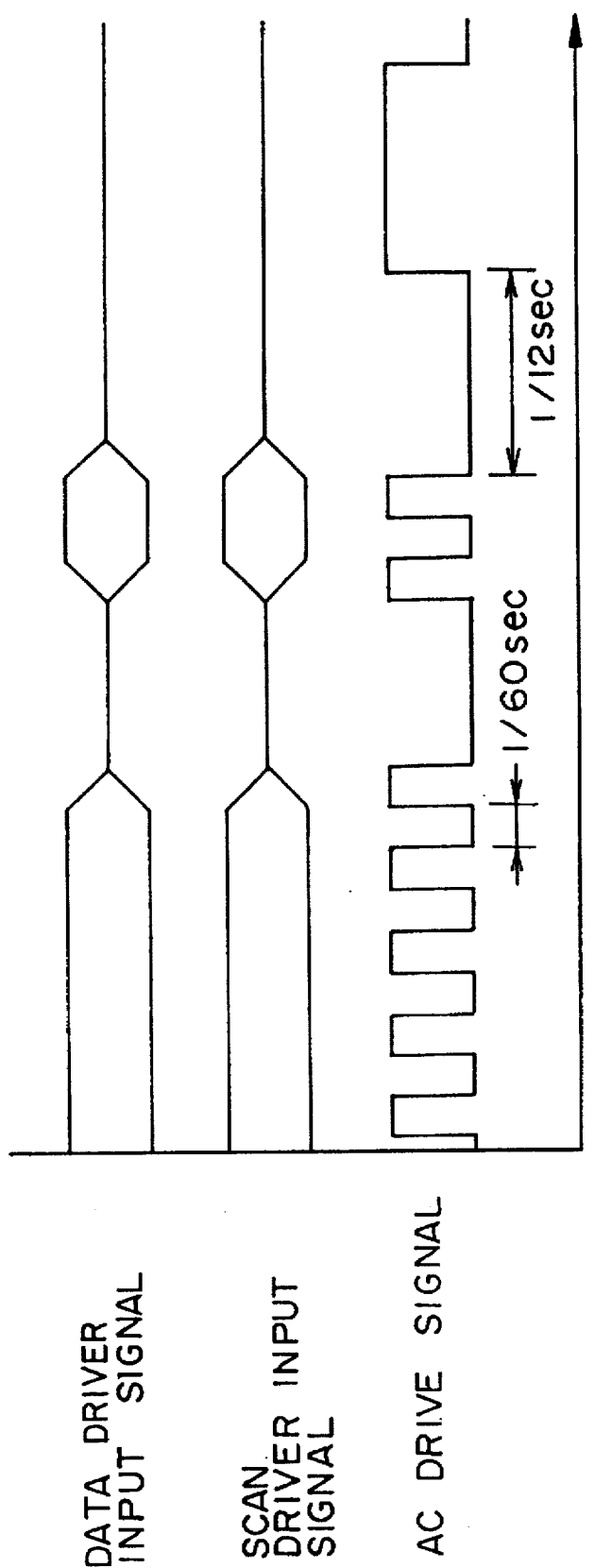
FIG. 7 is a timing chart for assistance in explaining the operation of the circuit shown in FIG. 6.

The second embodiment of the liquid crystal display device according to the present invention will be described hereinbelow with reference to FIGS. 6 to 8. In this embodiment, the frequency of the ac drive signal is dropped during the still picture display. Further, FIG. 6 is a block diagram showing the circuit construction thereof; FIG. 7 is a timing chart showing the operation thereof; and FIG. 8 is a block diagram showing an ac drive signal generating circuit shown in FIG. 6.

In FIG. 6, the liquid crystal display device 200 comprises a display section 150, a scan driver 15, and a data driver 14 for controlling the display section 150. The scan driver 15 controls the scanning lines on the basis of the scan driver input signal, and the data driver 14 controls the data lines on the basis of the data driver input signal. In the motion picture display, the frequency of the ac drive signal is set to the same frequency as the frame frequency, in the same way as with the ordinary liquid crystal display device. The scan driver 15 is composed of a scanning line signal generating circuit 50 and an ac drive signal generating circuit 60. During the still picture display, the ac drive signal generating circuit 60 switches the frequency of the ac drive signal down to a value 1/5 of that used during the motion picture display, in response to the scan driver input signal and the data driver input signal.

Figure 8:
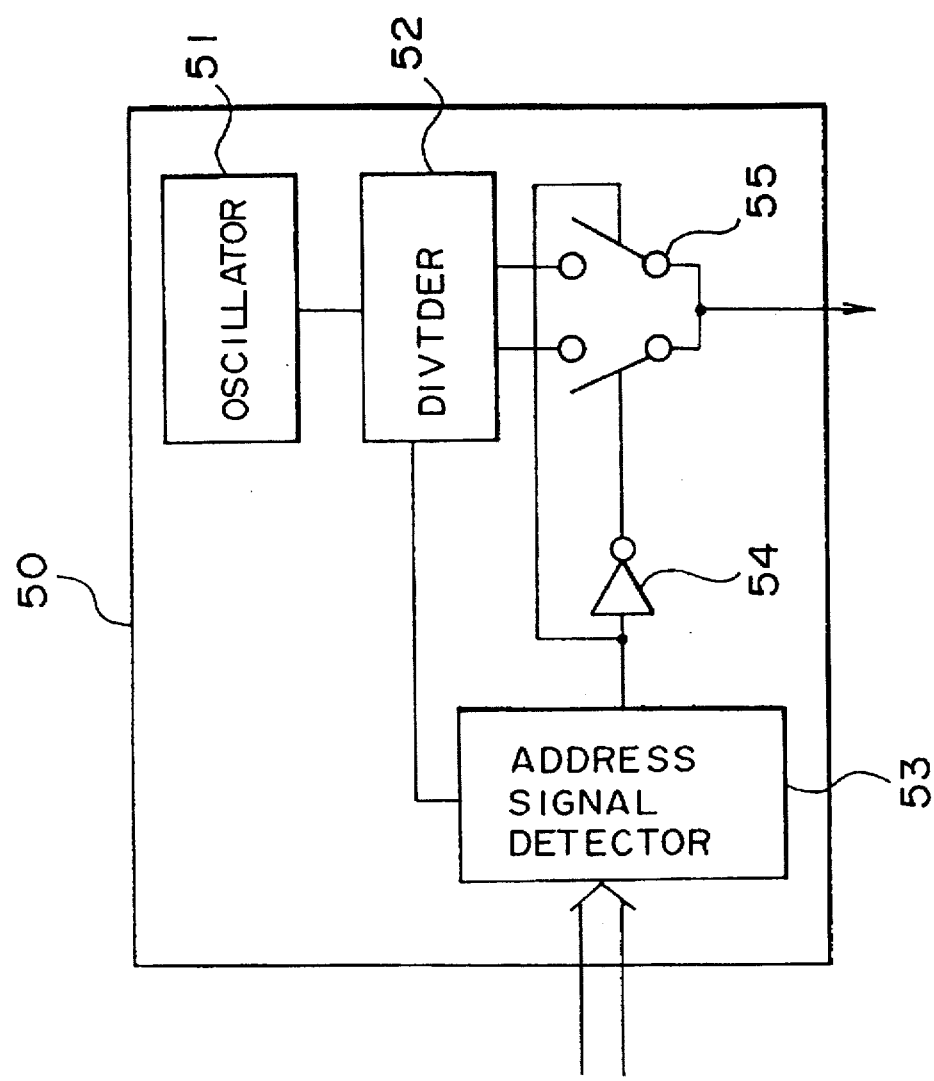
FIG. 8 is a more detailed circuit block diagram showing an ac drive signal generating circuit shown in FIG. 6.

As shown in FIG. 8, the ac drive signal generating circuit 50 comprises an oscillator circuit 51 having a quartz oscillator to generate a basic clock, a divider circuit 52 having various counters to generate a plurality of different frequency clock signals whose frequency is divided on the basis of the basic clock signal generated by the oscillator circuit, an address signal detecting circuit (e.g., a latch circuit) 53 for detecting whether the address signal changes or not at the rise edge or the fall edge thereof, and a switch circuit 55 controlled by the output signal of the address signal detecting circuit 53 and an inversion signal of an inverter 54, to select any one of a plurality of the clock signals.

In operation, for instance as shown in FIG. 7, a square wave signal of 30 Hz (½ period is 1/60 sec) and a square wave signal of 6 Hz (½ period is 1/12 sec) are prepared. Further, when the address signal is changing during the motion picture display, the clock signal of 30 Hz is selected, and when the address signal is kept stopped during the still picture display, the clock signal of 6 Hz is selected. On the basis of the above-mentioned control, it is possible to markedly reduce the power consumption.

Figure 9:
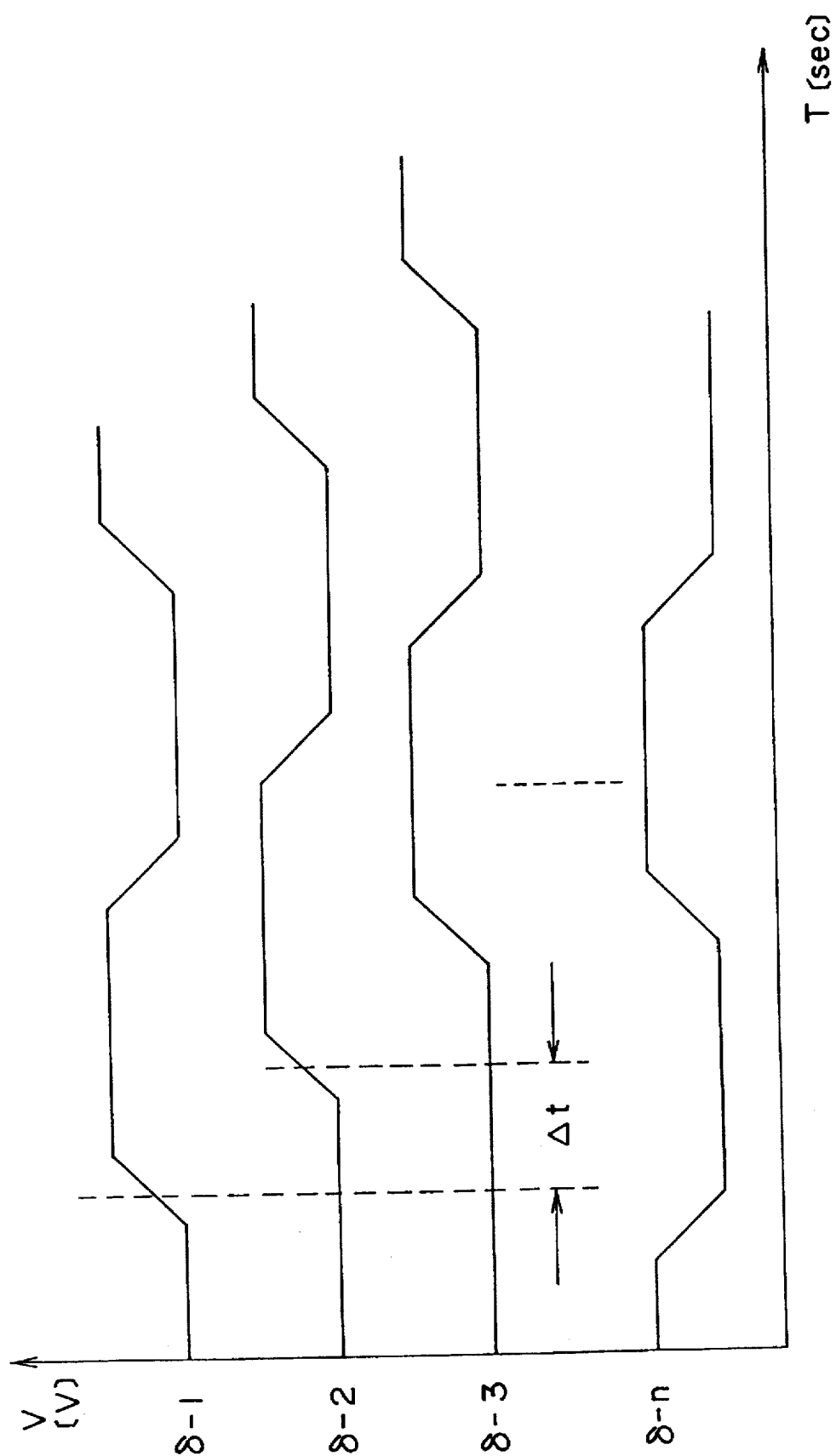
FIG. 9 is a timing chart for assistance in explaining the state where the ac drive signal lines are scanned in sequence in order to shift and further invert the timing for suppression of instantaneous current.

In the above-mentioned second embodiment, although the clock signal is generated by the ac signal generating circuit 50 of the scan driver circuit 15, it is also possible to provide the function of the ac signal generating circuit for an external display controller, in such a way that the output signal thereof can be supplied to the scan driver as a scanning line drive signal. Further, although the polarity of the ac drive signal lines 8 (8-1, 8-2, . . . , 8-n) can be inverted at the same timing, it is effective to invert the polarity of the ac drive signal lines by shifting the timing thereof, for suppression of the instantaneous current. This can be realized by a method of scanning the ac drive signal lines 8 from above in sequence, for instance. FIG. 9 shows an example of the above-mentioned ac drive signal.

In FIG. 9, an ac drive signal is applied to each of the respective ac drive signal lines 8-1, 8-2, . . . , 8-n corresponding to each of the respective scanning lines 2-n in such a way as to be shifted by a predetermined time interval Δt. Therefore, whenever the ac signal rises or falls, data are written in the liquid crystal cells 13 connected to the respective ac drive signal line 8-n in sequence being shifted by Δt. In other words, since the data are not written at the same time in all the liquid crystal cells 13 arranged in the display section, it is possible to prevent a large instantaneous current from flowing through the drive circuit.

In this case, however, since a part of the scan driver is operating even in the still picture mode, the power consumption increases to that extent, as compared with in the perfect still picture display mode. However, since the operating speed is sufficiently reduced and further since the number of pixels to be driven is also small, an actual increase of the power consumption is extremely small to such an extent as to be negligible, as compared with the total power consumption of the entire liquid crystal display device.

Further, in the above-mentioned embodiment, two nMOS-TFTs connected between two opposite-phase data lines are used as the pixel portion switching elements, that is, as the pixel portions TFTs 6 and 7. However, the present invention is not limited to only these pixel portion switching elements. That is, only a single transfer gate can be used as the pixel portion switching element. Further, a single TFT can be used. Or else, any switching element equivalent to the TFT from the circuit standpoint can be also used.

Further, as the transfer gates 9 and 11 formed by combining the TFTs, any other switching elements equivalent to the TFTs from the circuit standpoint can be used.

As described above, in the liquid crystal display device according to the present invention, since the liquid crystal cells can be driven in an ac mode while keeping the counter electrodes at a constant potential, which is different from the conventional device, it is possible to eliminate a large-capacity liquid crystal driver circuit system (e.g., about 0.2 μF in the conventional liquid crystal display device with a diagonal length of 6 inches), so that the liquid crystal device can be driven by an extremely small capacitance drive circuit. As a result, the size of the liquid crystal driver circuit system can be reduced; the structure and the manufacturing process thereof can be simplified; and the power consumption of the total liquid crystal display device can be minimized.

Further, although the above-mentioned embodiment has been explained by taking the case where the present invention is applied to the reflective structure liquid crystal display device, as far as the pixel size is relatively large and thereby a sufficient pixel aperture portion (a sufficient pixel area for each pixel) can be secured in an area excluding the circuit region, the present invention can be applied to a transparent structure liquid crystal display device, so that the similar effect as described above can be obtained.

Figure 10:
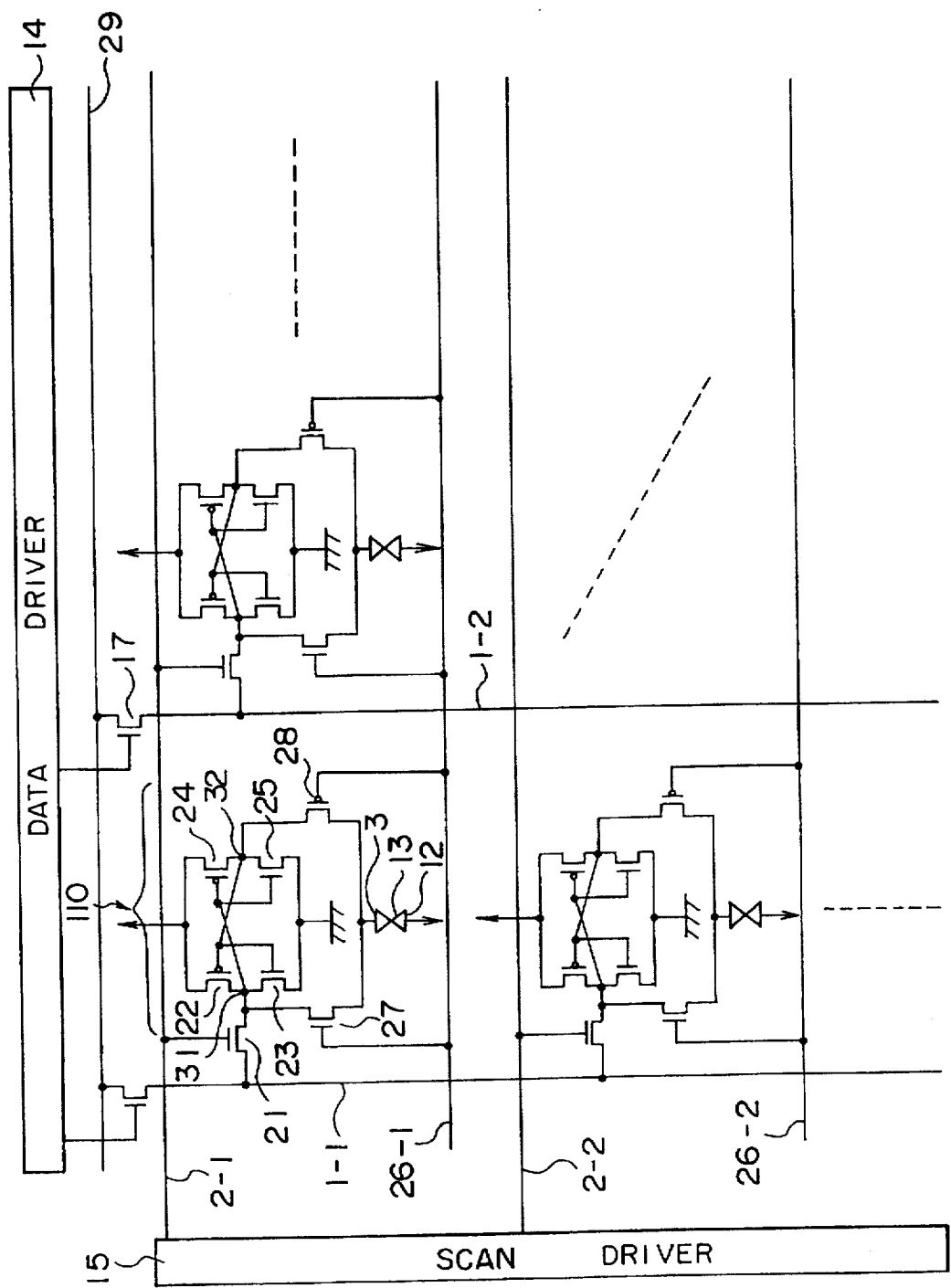
FIG. 10 is a schematic circuit diagram showing a third embodiment of the liquid crystal display device according to the present invention.

FIG. 10 is a circuit diagram showing a third embodiment of the liquid crystal display device according to the present invention, in which the same reference numerals have been retained for the similar elements having the same functions as with the case of the first embodiment shown in FIG. 1.

In FIG. 10, a plurality of data lines 1-1, 1-2, . . . , and a plurality of scanning lines 2-1, 2-2, . . . are arranged in a matrix form. Each intersection point of the matrix corresponds to each pixel, and a pixel electrode 3 for forming each pixel is formed in each intersection point. Further, in FIG. 10, the pixel electrode itself is not shown, but represented as an upper side electrode (terminal) of each liquid crystal cell.

The data lines 1-1, 1-2, . . . are connected to a video signal line 29 via a data line selecting TFT 17, respectively controlled by the data driver 14. The scanning lines 2-1, 2-2, . . . are driven by the scan driver 15. These two drivers are constructed by a general shift register type drive circuit.

To each of the data lines 1-1, 1-2, . . . , the drain electrode of the pixel portion TFT 21 is connected. The source of the same pixel portion TFT 21 is connected to a digital memory 110. Further, the gate electrode of the pixel portion TFT 21 is connected to the scanning line 2-2, . . . , so that the pixel portion TFT 21 can be turned on or off by the scanning line 2.

The output (the source and drain sides) of an inverter composed of two TFTs 22 and 23 is connected to the input (the source and drain sides) of another inverter composed of two TFTs 24 and 25. On the other hand, the gate of the TFT 24 is connected to the pixel electrode 3 of the liquid crystal cell 13 via the switch TFT 27 of a pair of two switches TFTs 27 and 28 both connected to and controlled by a polarity switching signal line 26-1.

The output (the source and drain sides) of the inverter composed of two TFTs 24 and 25 is connected to the input (the source and drain sides) of the inverter composed of the two TFTs 22 and 23. On the other hand, the gate of the TFT 22 is connected to the pixel electrode 3 of the liquid crystal cell 13 via the switch TFT 28 of a pair of the two switches TFTs 27 and 28 both connected to and controlled by the polarity switching signal line 26-1. Further, the other end (the lower side electrode (terminal) in FIG. 10) of the liquid crystal cell 13 is connected to a counter electrode 12.

As described above, in the structure of the liquid crystal display device according to the present embodiment, since the structure of the static type digital memory cell 110 formed at each pixel portion and the structure of the signal reading portion (i.e., the signal writing portion in the pixel electrode) are both formed by the polarity switching signal line 26 and a pair of two different-polarity TFTs controlled by the polarity switching single line 26, it is possible to simplify the structure of the display device markedly, in comparison with that of the conventional static type liquid crystal display device. In more detail, in the liquid crystal display device according to the present invention, since each pixel can be formed by use of only seven TFTs in total including the digital memory cell 110, the size of the display device can be reduced markedly, as compared with that of the conventional display device which requires eleven switching TFTs, as already explained.

An example of the liquid crystal display device of the circuit structure according to the present invention as described above, when the 640×480 dot (VGA) liquid crystal display panel is formed, the number of TFTs used for the entire screen can be reduced by as many as 600,000 pieces (which corresponds to about 30% or more of the total number of the TFTs) in total, in comparison with that of the conventional liquid crystal display device.

Accordingly, as compared with the conventional liquid crystal display device, it is possible to markedly simplify the circuit and physical structure thereof, with the result that the manufacturing yield can be improved markedly.

The above-mentioned advantage becomes more prominent with increasing number of the pixels and with increasing of the pixel density, as with the case of the High-Vision liquid crystal display device. In other words, in the conventional liquid crystal display device, an increases of the number of pixels and thereby an increase of definition or the further miniaturization of the respective pixel portions reaches almost its limit, respectively, so that it has been impossible to realize still a higher multipixel or still a higher definition. In the present invention, on the other hand, it is possible to increase the number of the pixels, improve the degree of the high definition, and realize the further microminiaturization of the pixel portions.

The operation of the third embodiment of the liquid crystal display device according to the present invention will be described hereinbelow.

In the motion picture display, the scan driver 15 selects the scanning lines one by one at each scanning timing from above to below in the display screen, to turn on the pixel portion TFTs 21 arranged for each row.

Then, a video signal is inputted to the video signal line 29. Further the data driver 14 turns on the data line selecting TFT 17 in synchronism with a reference clock, so that the video signal is written in a node (31) side of the digital memory cell 110 via the pixel portion TFT 21.

In this case, the polarity switching signal line 26 is kept at a constant high level potential to turn on any one switch TFT 27 of a pair of the two polarity switching TFTs, so that an applied voltage is written in the pixel electrode 3 of the liquid crystal cell 13.

The above-mentioned applied voltage writing operation is effected for each pixel arranged in each scanning line 2 in sequence from one end to the other end of the scanning line. Further, the above-mentioned applied voltage writing operation is effected for all the scanning lines, so that desired video signals can be written in all the pixels arranged all over the display area of the picture.

Further, as is well known, the liquid crystal cells are driven by an ac drive voltage. This is because the liquid crystal deteriorates when a dc voltage is kept applied thereto. Therefore, when the voltage opposite to the above-mentioned voltage is written, the video signal is written in the pixel electrode 3 of the liquid crystal cell 13 via the switch TFT 28 controlled by the polarity switching signal line 26. That is, the polarity switching signal line 26 is kept at a low level potential, and the video signal is inverted by the inverter composed of the two opposite side TFTs 24 and 25 of the digital memory cell 110. The inverted video signal (voltage) at the node (32) side (opposite to the node (31) side) is written in the pixel electrode 3 of the liquid crystal cell 13 via the switch TFT 28.

The operation of the liquid crystal display device during the still picture display will be described herein-below.

The pixel portion TFTs 21 is of n-channel type. Therefore, when a positive pulse is applied from the scanning line drive 15 to the scanning line 2, all the pixel portion TFTs 21 each having a gate connected to the scanning line 2 are turned on.

Under these conditions, when the data line selecting TFT 17 is turned on by the data driver 14, the potential of the video signal line 29 is written in the digital memory cell 110 from the node (31) side. In this case, if the potential of the data line 1 is at a high level, a high level signal (potential) is written on the node (31) side and a low level potential is written on the node (32) side. These potentials will not change and held by the digital memory cell 110 until the a low level potential is written by the data line 1 via the pixel portion TFT 21.

In the case where the potential on the node (31) side of the digital memory cell 110 is at the high level, whenever the potential of the polarity switching line 26 is set to the high level, the n-channel TFT 27 is turned on, so that the high level potential on the node (31) side is written in the pixel electrode 3.

Further, whenever the potential of the polarity switching line 26 is set to the low level, the p-channel TFT 28 is turned on, so that the high level potential on the node (32) side is written in the pixel electrode 3.

Here, when the potential level of the polarity switching signal line 26 is changed to both the high level and the low level alternately and further when the potential (voltage level) of the counter electrode 12 is changed to the low level and the high level alternately at the same time, it is possible to ac-drive the liquid crystal cell 13, without changing the potential of the data line 1 during the still picture display, with the result that the liquid crystal display device can be driven under a lower power consumption.

Therefore, after the video signals of the whole picture are once written in all the pixel electrodes, even if the data driver 14 and the scan driver 15 are both not at all driven, or if the video signals are not supplied by the video signal line 29, it is possible to always display a still picture. Here, in the present embodiment, if the liquid crystal device is in normally white mode, the display mode is such that white is displayed when the polarity switching signal line 26 and the counter electrode 13 are both kept at the high or low level, and black is displayed when one of them is kept at the high level and the other is kept at the low level.

When the pixel portion TFTs 21 is turned on and further the potential of the video signal (voltage) supplied by the video signal line 29 (e.g., the potential of the data line 1) is at the low level, the potential of the node (31) side drops to the low level and the potential of the node (32) side rises to the high level.

Further, once the pixel portion TFT 21 is turned off, data in the memory cell 110 is held therein until the succeeding data is written therein.

Here, in the same way as described above, it is possible to ac-drive the liquid crystal cell 13 by changing the potentials of the polarity switching signal line 26 and the counter electrode 12 to the high and low levels alternately.

Figure 11A:
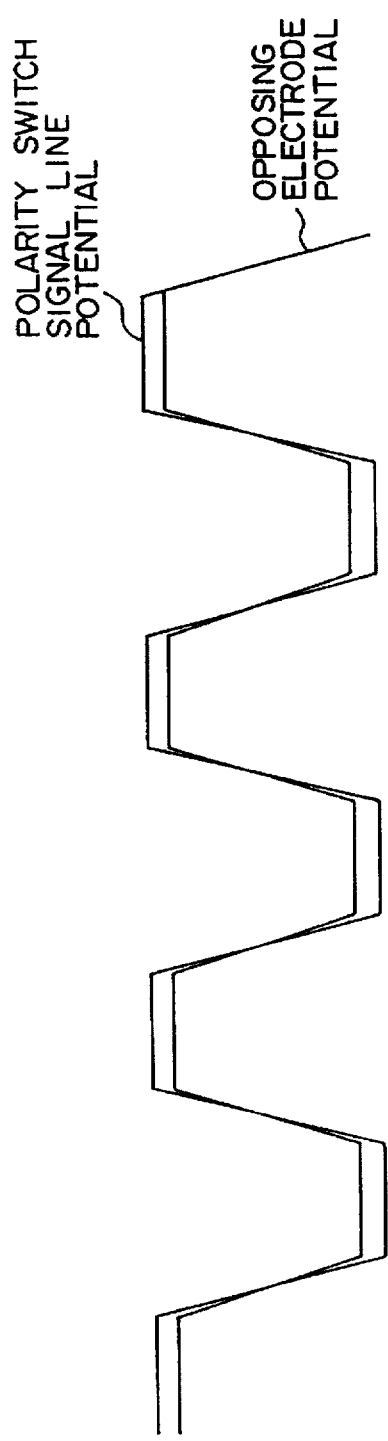
FIGS. 11(a) and 11(b) are timing charts each for assistance in explaining the waveforms of applied voltages used to display still picture in the third embodiment of the display device according to the present invention.
Figure 11B:
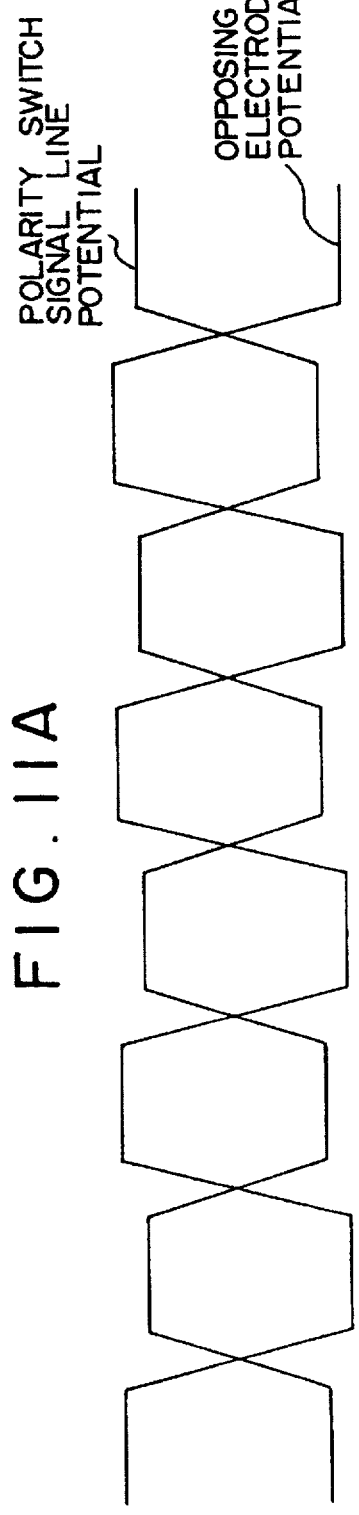

FIGS. 11(a) and 11(b) are timing charts showing the applied voltage waveforms obtained when the third embodiment of the liquid crystal display device according to the present invention displays a still picture. In the case where the liquid crystal display device is of normally white mode, if the polarity switching signal line 26 and the counter electrode 12 are both at the high level or the low level as shown in FIG. 11(a), black is displayed. On the other hand, if one of the polarity switching signal line 26 and the counter electrode 12 is at the high level and the other of the two is at the low level as shown in FIG. 11(b), white is displayed.

Here, it is preferable to simultaneously form the data driver 14 for controlling the data lines 1 and the scan driver 15 for controlling the scanning line 2 together with the various elements such as the pixel portion TFTs 21 and the wires such as the scanning lines 2, by use of the same material and in accordance with the same manufacturing process thereof. Further, it is preferable to simultaneously form the scan driver 15 for controlling the scanning lines 2 together with the various elements such as the pixel portion TFTs 21 and the wires such as the scanning lines 2, by use of the same material and in accordance with the same manufacturing process thereof.

As described above, when the liquid crystal drive circuit system such as the data driver 14 and the scan driver 15 are formed by use of the same material and in accordance with the same manufacturing process, since it is unnecessary to connect the liquid crystal drive circuit system to the outside of the liquid crystal display device as an external IC circuit, there exist various advantages such that the device structure and therefore the device manufacturing method can be simplified, and thereby the device cost can be reduced. In addition, there exists another advantage such that the specification of the display device (e.g., pixel pitch) can be designed freely without any restriction of the interface between the display device and the external drive circuit such as the liquid crystal driver IC.

Here, when the current drive capability (gate turn-on capability) of the pixel portion TFTs 21 controlled by the scanning lines 2 is denoted by G1; the current drive capability of the TFTs 22, 23, 24 and 25 for constituting the digital memory cells 110 is denoted by G2; and the current drive capability of the pair TFTs 27 and 28 controlled by the polarity switching signal lines 26 is denoted by G3, it is desirable to determine these relationship as G1 >G2 >G3.

This is because the potential on the node (31) side is decided by the comparison in potential between the pixel portion TFT 21 controlled by the scanning line 2 and the TFTs 22, 23, 24 and 25 of the digital memory cell 110. In other words, if the current drive capability G1 of the pixel portion TFT 21 controlled by the scanning line 2 is smaller than that G2 of the TFTs 22, 23, 24 and 25 for constituting the digital memory cell 110, the potential of the data line 1 cannot be written in the node (31) side. Further, if the current drive capability G3 of the pair TFTs 27 and 28 controlled by the polarity switching signal line 26 is larger than that G2 of the TFTs 22, 23, 24 and 25 for constituting the digital memory cell 110, when data (video signal) is written in the pixel electrode 3 of the liquid crystal cell 13, the data held in the digital memory cell is destroyed or disturbed and thereby changed.

Figure 12:
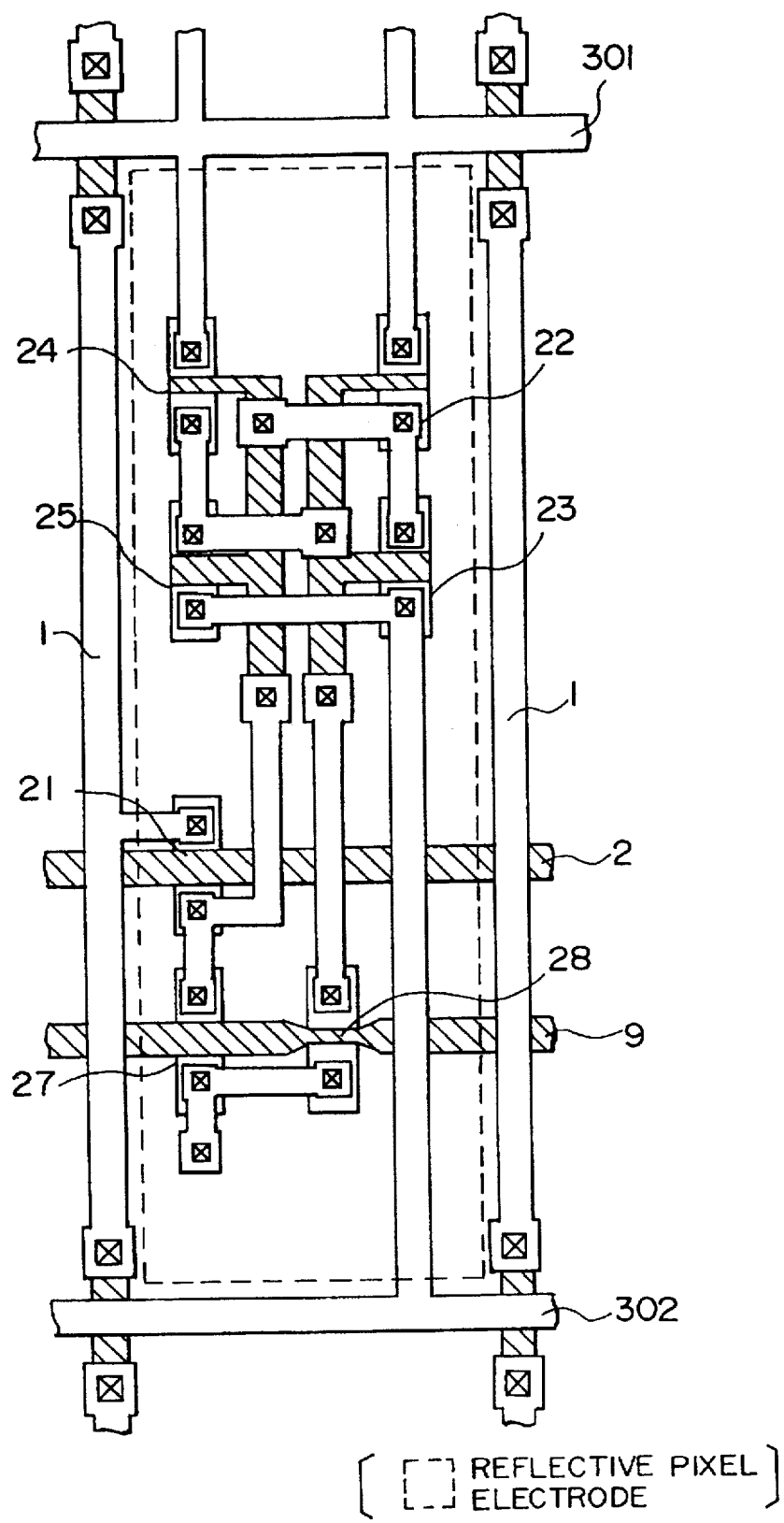
FIG. 12 is a plane view showing the structure of the pixel portion of a third embodiment of the display device according to the present invention.

The structure of the pixel portion of the third embodiment of the liquid crystal display device according to the present invention will be described hereinbelow with reference to FIGS. 12 to 13. FIG. 12 is a plan view showing the circuit pattern of one pixel portion of the reflective type liquid crystal display device using poly-Si TFTs as the various TFTs. Further, FIG. 13 is a cross-sectional view thereof.

As shown in FIG. 12, each pixel region is formed by forming a pixel electrode 3 in a region enclosed by two voltage supply line 301 (Vdd) and a voltage supply line 302 (Vss) and two data lines 1. Under the pixel electrode 3, there are formed the scanning line 2, the polarity switching signal line 26, the pixel portion TFT 21, the elements TFTs 22, 23, 24 and 25 for constituting the digital memory cell 110, a pair of the switch elements TFTs 27 and 28, and wires for connecting these elements, respectively. Further, the whole surface of the pixel region is covered with a pixel electrode 3 via an electric insulating layer 401.

Figure 13:
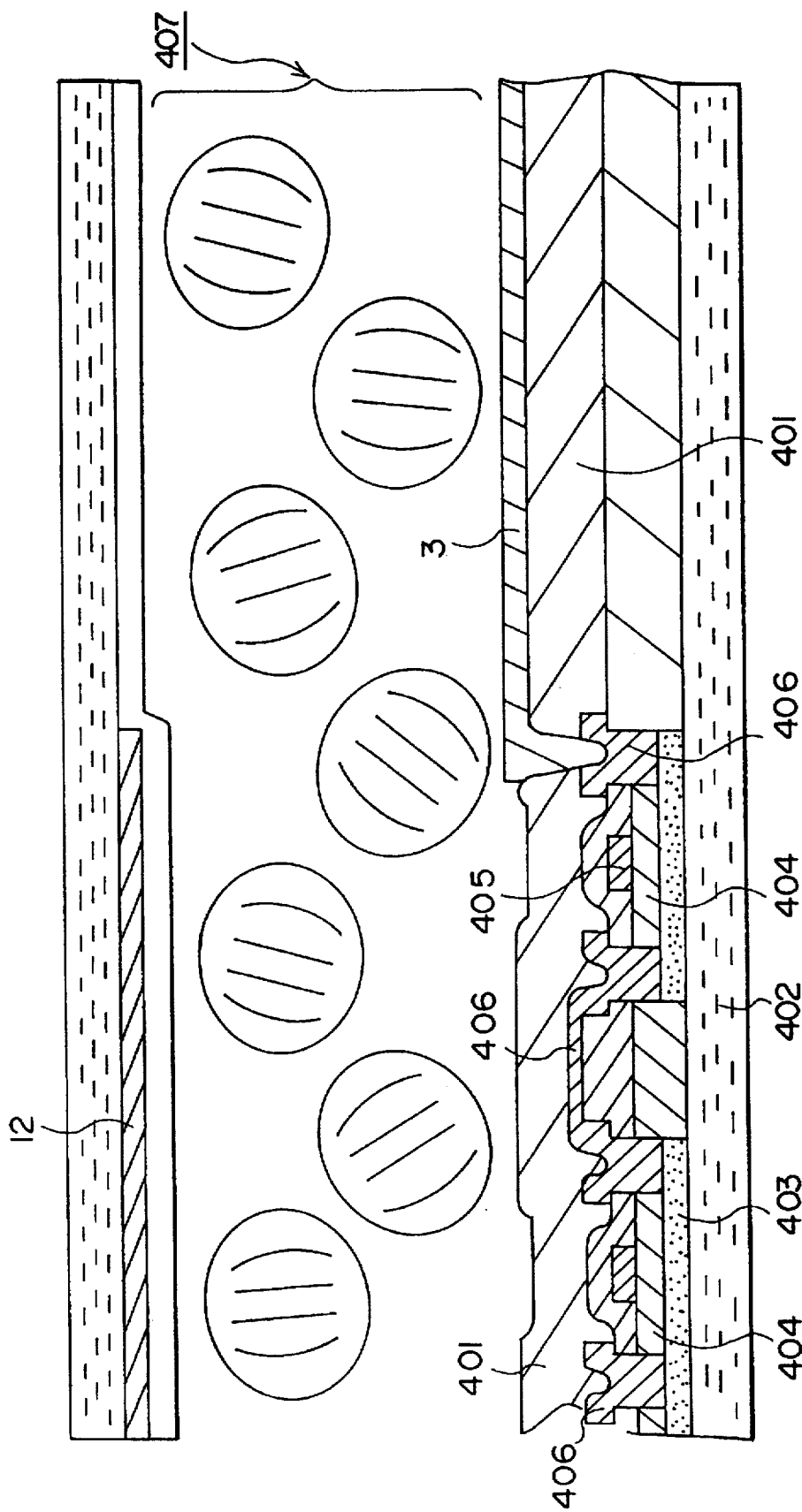
FIG. 13 is a cross-sectional view of the display device shown in FIG. 12.

On the other hand, in the cross-sectional structure, as shown in FIG. 13, a poly-Si film 403 is formed on a glass substrate 402. All the TFTs 22, 23, 24 and 25 are of MOS structure TFT elements such that a thin gate oxide film 404 is formed on the poly-Si film 403 and further a gate electrode 405 is formed on the gate oxide film 404. Further, each source electrode and each drain electrode thereof are formed by an Al-Si film 406 connected to the poly-Si film 403 ohmically.

Here, the poly-Si film 403 can be formed by forming an a-Si (amorphous silicon) film on the glass substrate 402 by low pressure CVD method and thereafter by annealing the formed a-Si film by use of an excimer laser.

The gate oxide film 404 is a $SiO_2$ film formed by the CVD method. Here, the gate electrode 405 is of a double-layer structure composed of a $WSi_x$ (tungsten silicide) film and a poly-Si film in order to reduce the wiring resistance thereof.

The specifications of each of the poly-Si TFTs are such that the channel length of p-channel MOS (pMOS) TFT is L=4.5 μm; the channel width thereof is W=8 μm; the channel length of nMOS TFT is L=6 μm; and the channel width thereof is W=8 μm.

The reflective type pixel electrode 3 is formed by aluminum, and connected to the switching TFTs 27 and 28 through contact holes (See FIG. 12). Further, a polymer distributed type liquid crystal layer 404 is injected and encapsulated between the pixel electrode 3 and the counter electrode 12. The formed liquid crystal layer can be used as a polymer distributed type liquid crystal display panel, without use of any polarizer. Further, in this embodiment, the polymer distributed type liquid crystal is formed by distributing liquid crystal into a high molecular resin in droplet manner. Without being limited thereto, however, it is also possible to use a guest-host type liquid crystal composition mixed with dye, for instance as the liquid crystal material.

Figure 14:
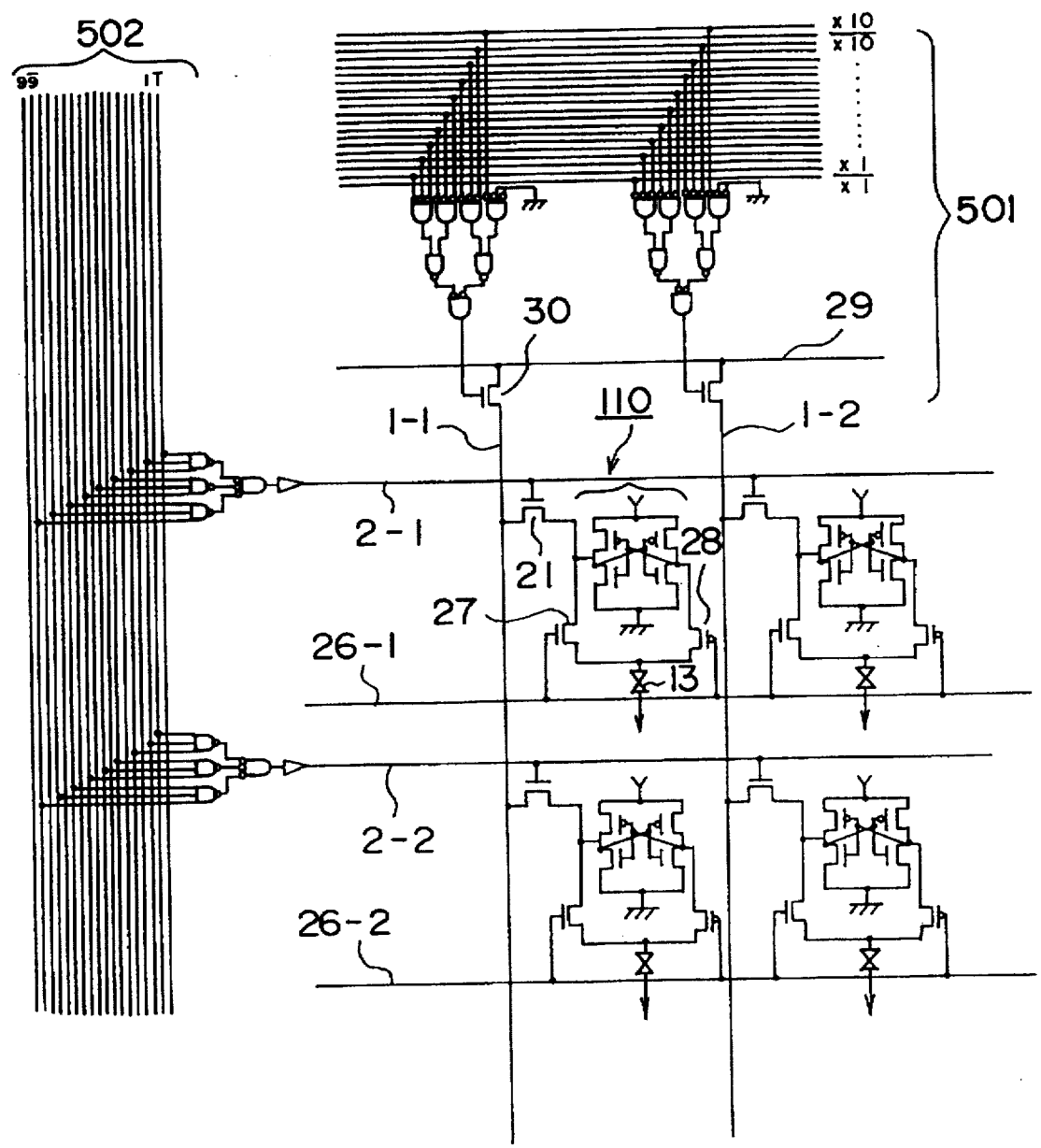
FIG. 14 is a schematic circuit diagram showing a fourth embodiment of the liquid crystal display device according to the present invention.

FIG. 14 shows the circuit structure of a fourth embodiment of the liquid crystal display device according to the present invention.

In the liquid crystal display device according to the present embodiment, the circuit construction of the pixel portion is quite the same as with the case of the first embodiment, except that a decoder type liquid crystal drive circuit is used as the liquid crystal drive circuit system to drive the data lines 1 and the scanning lines 2 respectively, instead of the shift register type drive circuit system of the first embodiment.

In more detail, as shown in FIG. 14, a decoder type liquid crystal drive circuit system, that is, a data driver 501 and a scan driver 502 are both arranged at the peripheral portion of a picture display region in which the pixels are arranged. In these decoder 501 and 502, a logical circuit is provided in such a way that line activation signals can be generated whenever the address signals match the respective data lines or the respective scanning lines.

In more detail, in response to a 10-bit address signal (e.g., 0000000000, 0100100111, etc.) for instance, the data driver 501 outputs a [1] to data line 1 corresponding to this address signal to select a specific data line 1. In the same way, in response to a 9-bit address signal for instance, the scan driver 502 selects a specific scanning line 2 corresponding to the inputted address signal.

In general, the numerical value signals are inputted to these drivers in such a way that the data line 1 or the scanning line 2 can be addressed in sequence beginning from an end of the display region. However, when the numerical signals are set appropriately, it is possible to select the data lines or the scanning lines so that new voltages (video signals) can be written only in the display portion pixels at which the images are changed, without writing the voltages in the display portion pixels at which the images do not change, that is, by holding the previous voltages thereat. Accordingly, it is possible to further reduce the power consumption, as compared with the case of the aforementioned embodiments, in which the shift register type liquid crystal drive circuit system is used to drive the data lines 1 and the scanning lines 2, respectively.

Here, the case where a wide vista picture having an aspect ratio of 16:9 is display within an ordinary television picture having an aspect ratio of 4:3 will be taken into account by way of example.

Figure 15A:
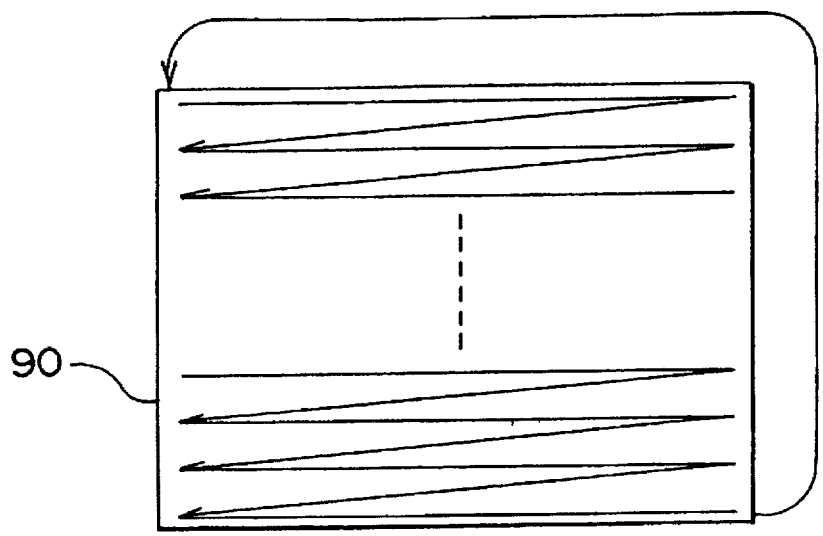
FIG. 15(a) is an illustration for assistance in explaining the display portion when the ordinary television screen is used.
Figure 15B:
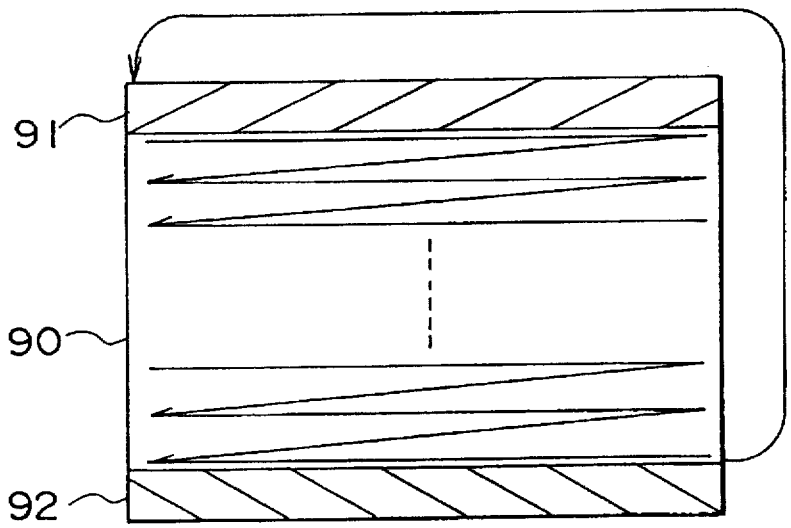
FIG. 15(b) is an illustration for assistance in explaining the non-display when the ordinary television screen is used as a vista size.

FIG. 15(a) shows the scanning status of an ordinary picture, in which motion pictures are displayed within a full size of the screen 90. In this case, the scanning lines are shifted from above to below after each scanning line moves from the leftmost end to the rightmost end. Further, FIG. 15(b) shows the scanning status, in which motion pictures are displayed within a vista size of the screen 90. In this case, in order to set the number of the scanning lines to the vista aspect ratio (ratio of horizontal to vertical length), two non-displayed areas 91 and 92 are formed on both the upper and lower sides of the screen 90. In these black non-display areas 91 and 92, after black is once written, the written potentials are held by the digital memory cells 110 at the pixels, without writing new voltages or without changing the voltages until the power of the liquid crystal display device is turned off. That is, the canning operation is repeated only within the middle portion of the screen in order to write video signals therewithin, that is, to display motion pictures by changing the images in accordance with the newly written video signals thereat. Further, in the case of the oblong Cinema Scope display, the aspect ratio of the black pixel portions further increases in comparison with the vista display.

According to the present invention, owing to the above-mentioned operation, it is possible to further reduce the power consumption, as compared with the case of the aforementioned embodiments of the liquid crystal display device using the liquid crystal drive system of shift register type.

Figure 16:
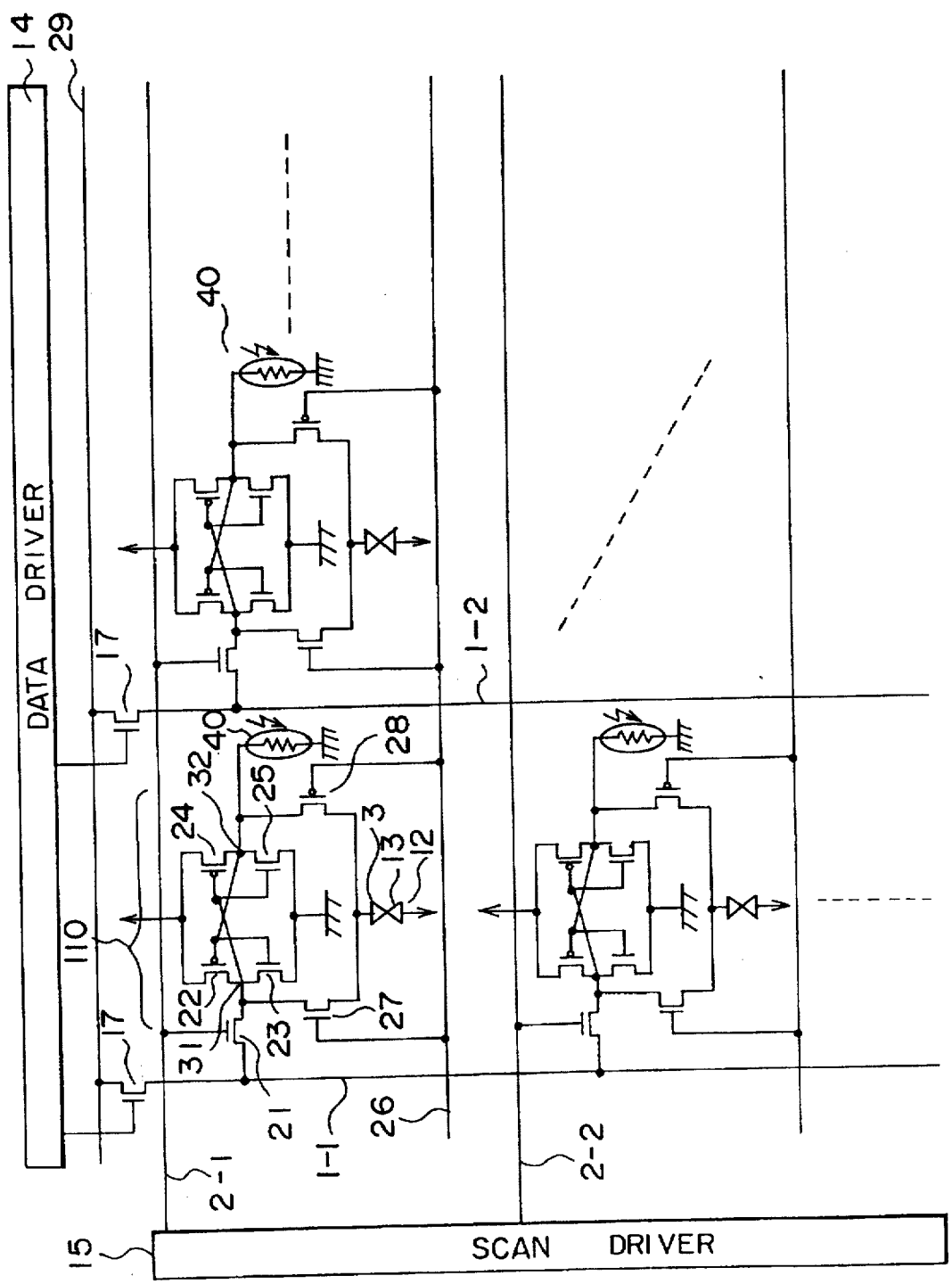
FIG. 16 is a schematic circuit diagram showing a fifth embodiment of the liquid crystal display device according to the present invention provided with an input function.

FIG. 16 shows a fifth embodiment of the liquid crystal display device according to the present invention, in which the same reference numerals have been retained for the similar elements having the same function as with the case of the afore-mentioned embodiments without repeating the similar description thereof.

The fifth embodiment is quite the same as with the case of the first embodiment in construction of the data lines 1, the scanning lines 2, the liquid crystal cells 13, the data driver 14, the scan driver 15, the TFTs 21, the memory cell 110, the switching TFTs 27 and 28, etc., except a photoelectric transfer element 40 is connected to each node 32. Further, the other end of this photoelectric transfer element 40 is grounded.

The operation of this fifth embodiment will be explained hereinbelow. The operation of the motion picture and the operation of the still picture are both quite the same as with the case of the third embodiment. Therefore, only the feature of this fifth embodiment, that is, the operation of the image signal input will be explained hereinbelow.

First, the data driver 14 and the scan driver 15 are both stopped. When a photoelectric transfer element 40 in the pixel is irradiated with light of a specific wave length and a specific intensity by use of light inputting means such as light pen, since the photoelectric transfer element 40 is turned on, the node 32 is set to a low level (GND). Here, since the memory is of flip-flop type, the opposite node 31 is set to the high level.

Here, when the potentials of the polarity switching signal line 26 and the counter electrodes 12 are applied to the liquid crystal layer by changing the phases thereof so as to be opposite to each other, white display in the normally white mode changes to black display. In other words, the node 31 of the pixel at which the photoelectric transfer element 40 is irradiated with light changes to the high level, so that black can be displayed. Further, in the case of the black display from the beginning, the black display will not change.

After the input operation with the use of the light inputting means, the data driver 14 and the scan driver 15 are both driven to read data at each node 31 of each pixel, so that input video data can be read in the video RAM.

The data driver 14 for controlling the data lines 1 is formed simultaneously with the pixel portion switching TFTs and wires in accordance with the same process. Further, the scan driver 15 for controlling the scan lines 2 is formed simultaneously with the pixel portion switching TFTs 27 and 28 and wires in accordance with the same process. When the drivers are formed by the same process as that of the pixel portions, it is unnecessary to attach an external driver IC to the display device from the outside, so that there exists an advantage that the cost of the display device can be reduced. Further, there exists another advantage that the pixel pitch can be determined freely, without considering the interface between the display device and the external driver circuits.

Figure 17:
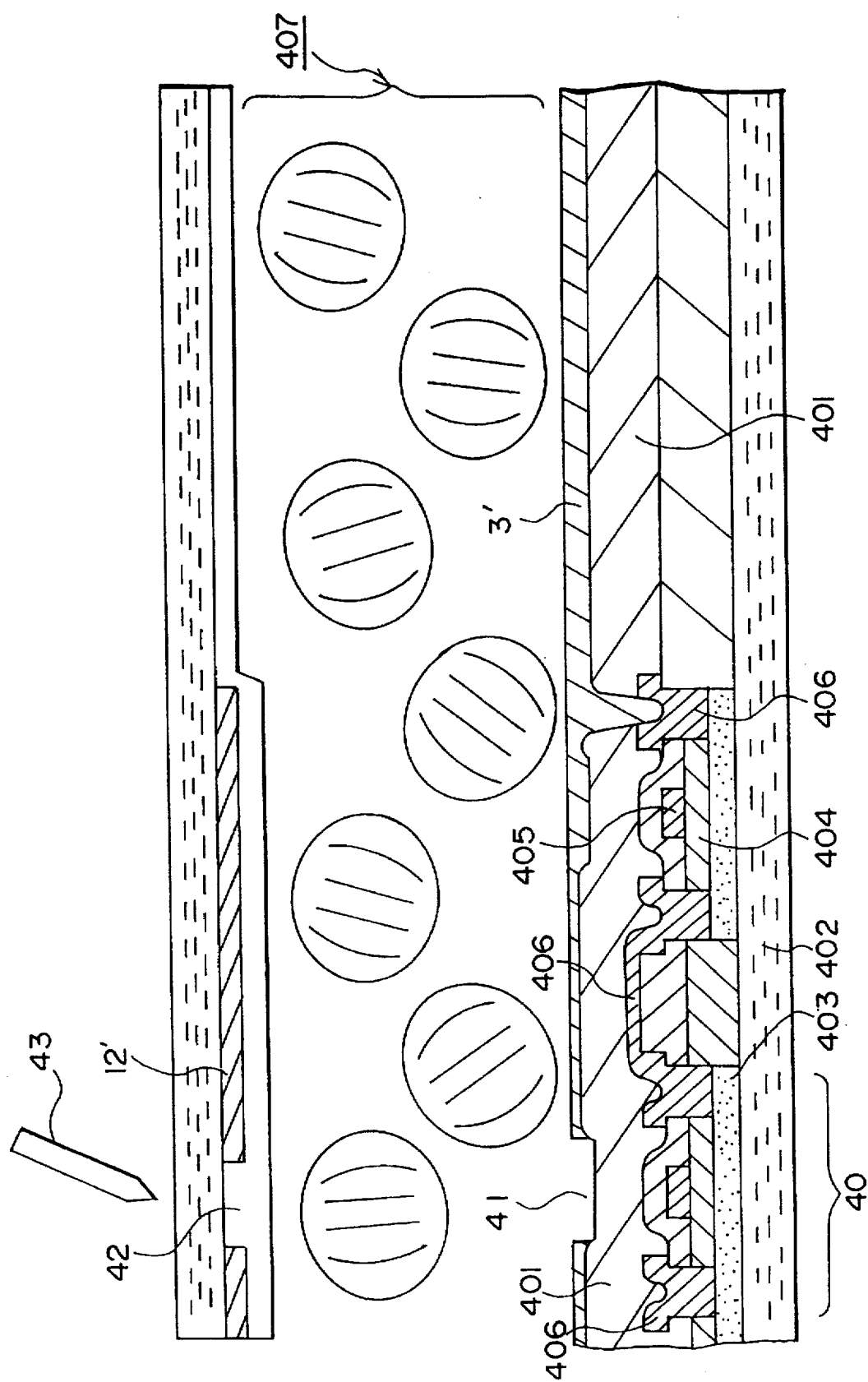
FIG. 17 is a cross-sectional view showing a modification of the fifth embodiment, in which polycrystalline silicon thin film transistors are used as the switching elements as the reflective type liquid crystal display device.

FIG. 17 is a cross-sectional view showing the reflective type liquid crystal display device realized by use of polycrystalline silicon TFTs as the switching elements, in which the same reference numerals have been retained for the similar elements having the same functions as with the case of the third embodiment shown in FIG. 13, without repeating the similar description.

Although being connected to the switching element via a contact hole 406, an aluminum reflective pixel electrode 3' is formed over the insulating film 401 broad enough to include the element forming portion. Further, an aperture portion 41 is formed in the aluminum reflective pixel electrode 3' only at a portion at which the photoelectric transfer element 40 is formed.

The photoelectric transfer element 40 is formed in the similar structure as that of the other switching elements. In the counter electrode 12', another aperture portion 42 is formed so as to correspond to the photoelectric transfer element 40. Therefore, when the photoelectric transfer element 40 is irradiated with light with the light inputting means 43 such as a light pen, the source-drain of the photoelectric transfer element 40 is turned on into conductive state.

Figure 18:
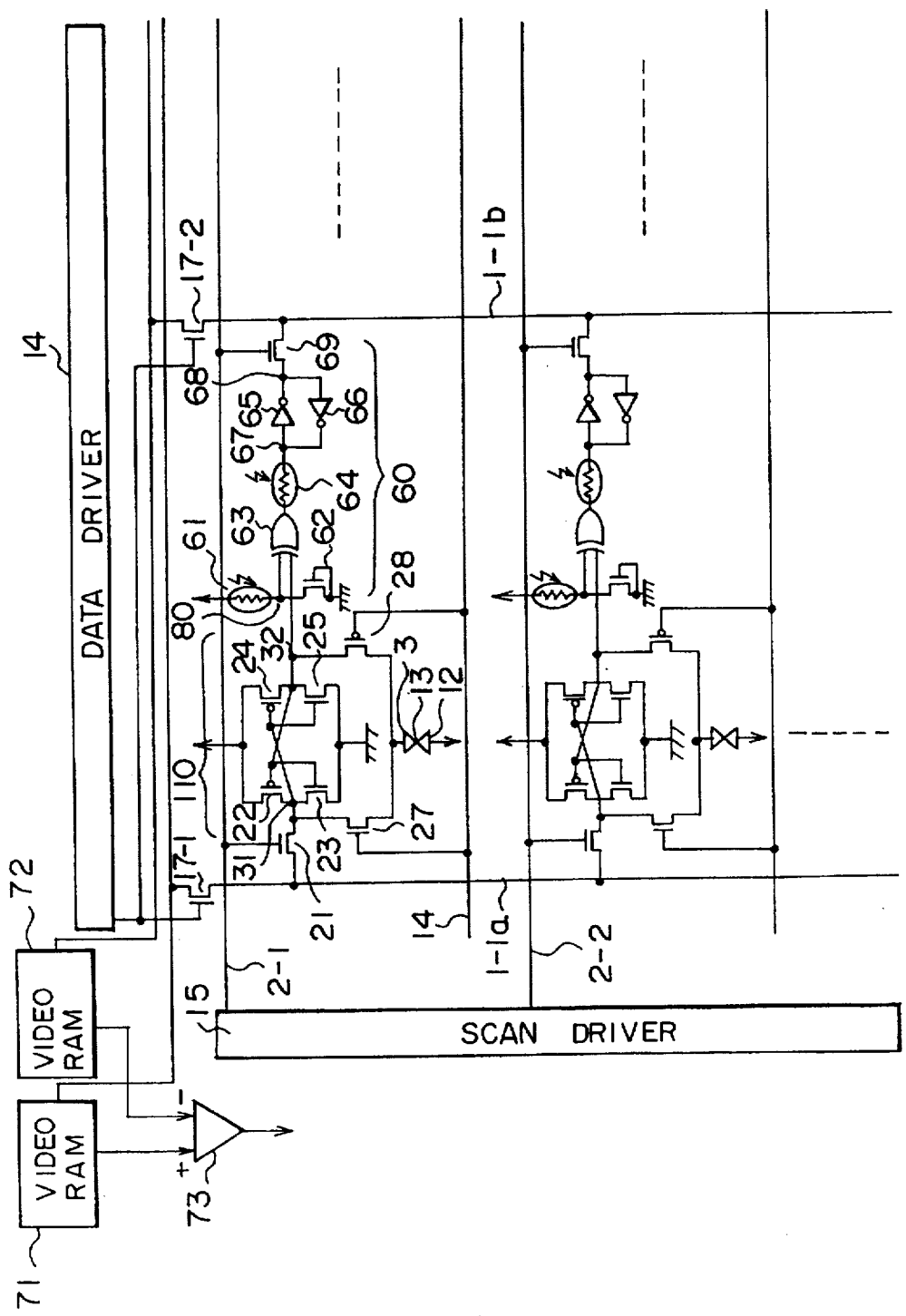
FIG. 18 is a schematic circuit diagram showing a sixth embodiment of the liquid crystal display device according to the present invention.
Figure 19:
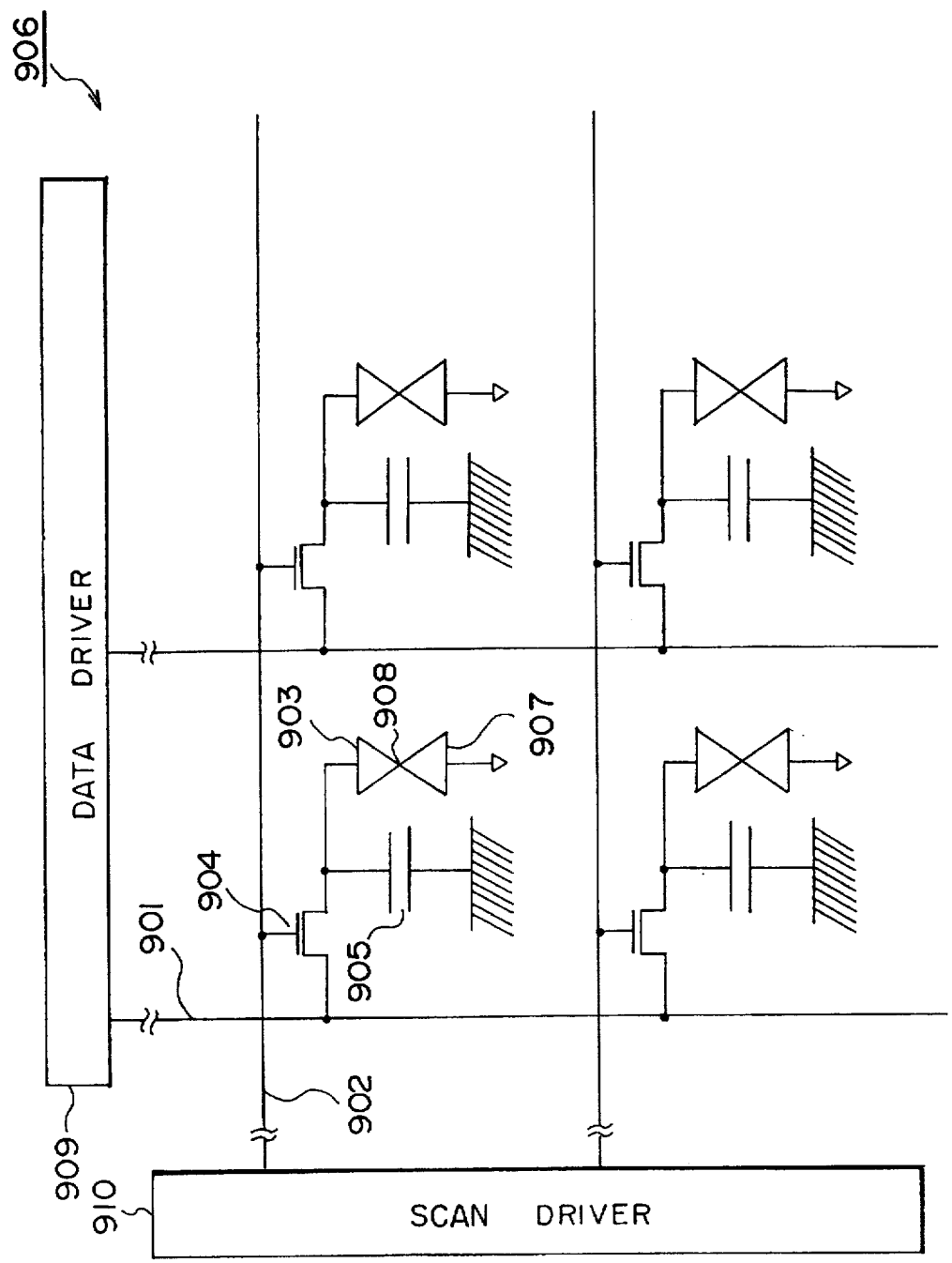
FIG. 19 is a circuit diagram showing the general prior art liquid crystal display device.
Figure 20:
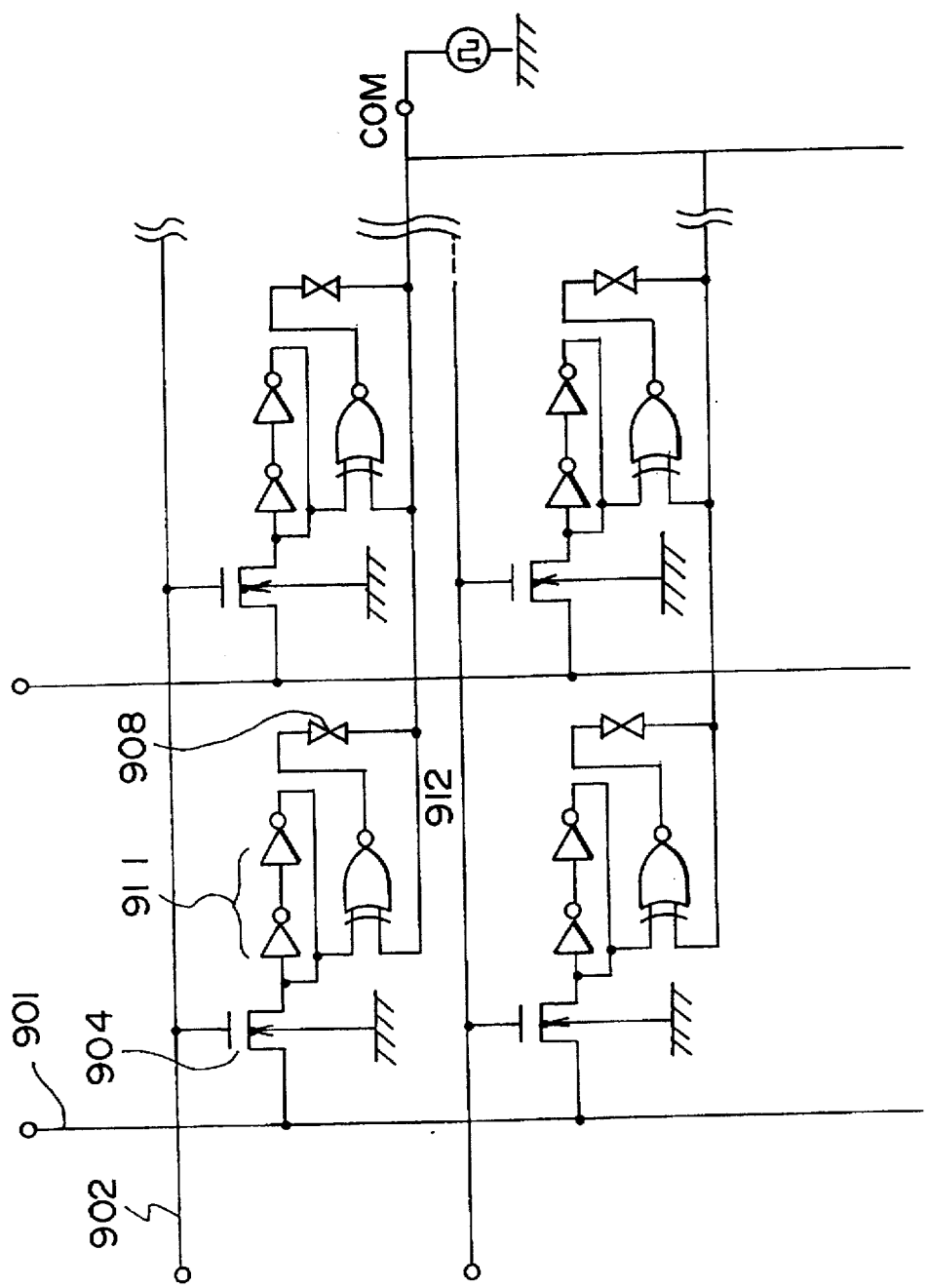
FIG. 20 is a circuit diagram showing a first example of the prior art static type liquid crystal display device.
Figure 21:
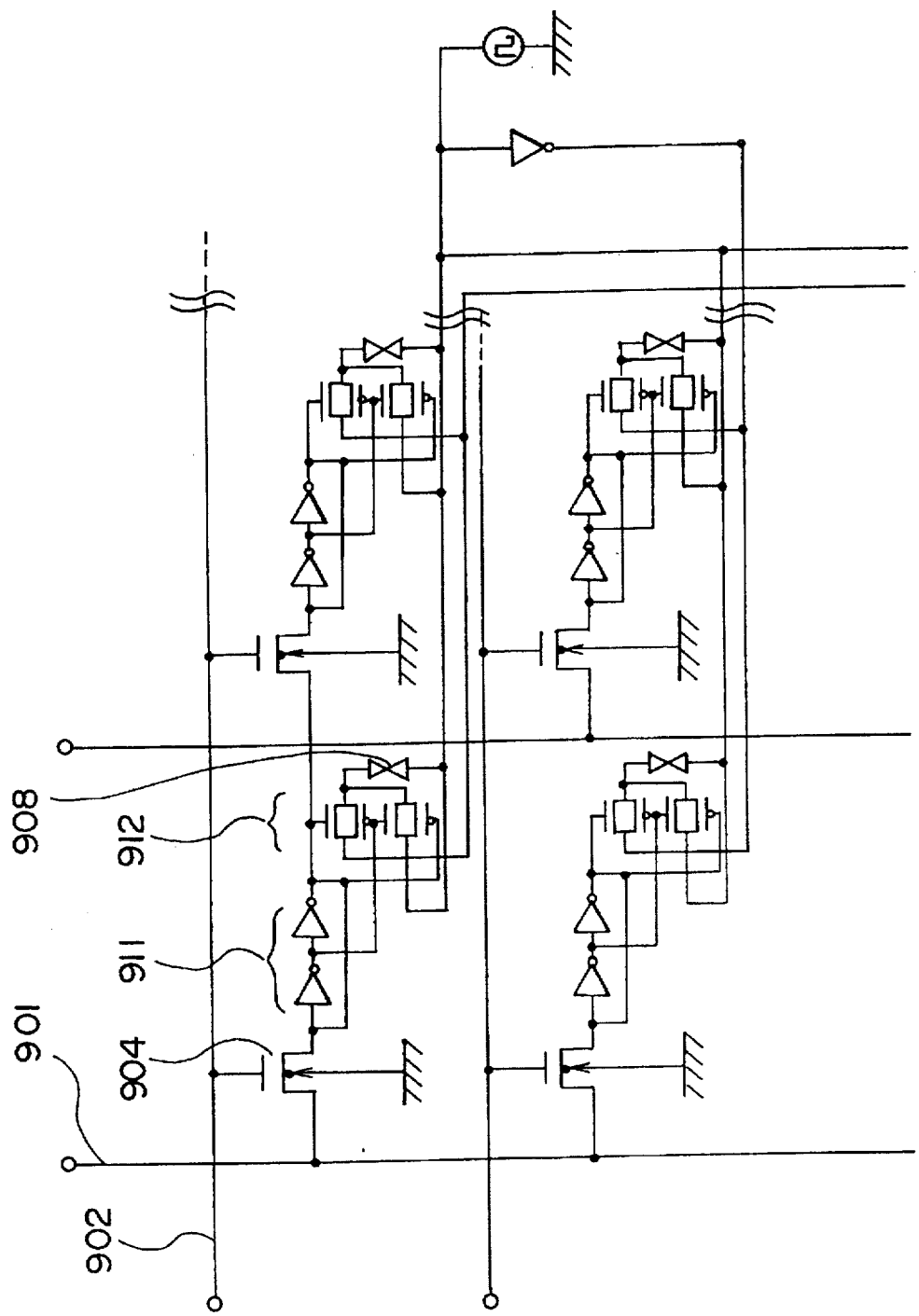
FIG. 21 is a circuit diagram showing a second example of the prior art static type liquid crystal display device.

FIG. 18 is a circuit diagram showing a sixth embodiment of the liquid crystal display device according to the present invention.

The sixth embodiment is quite the same as the first embodiment in construction of the scanning lines 2, the liquid crystal cells 13, the data driver 14, the scan driver 15, the TFTs 21, the memory cell 110, the switching TFTs 27 and 28, etc., therefore the detailed description thereof being omitted herein. This sixth embodiment is different from the first embodiment in that the data lines 1 are divided into two of writing and reading lines (e.g., 1–1a, 1–1b) for each address, and each of these two data lines are selected by data line selecting TFTs 17-1 and 17-2, respectively and further in that there are provided a position detecting circuit 60 connected to the node 32, the two video RAMs (71 and 72) for writing and reading, and a comparator 73 for comparing the outputs of these video RAMs.

The position detecting circuit 60 is composed of a first photoelectric transfer element 61 connected in series with a transistor 62 self-biased between the supply voltage and the ground, an exclusive OR gate 63 having two input terminals connected to a junction point between the first photoelectric transfer element 61 and the transistor 62 and to the node 32, a second photoelectric transfer element 64, a flip-flop memory composed of two inverters 65 and 66 connected into a loop on the output side of the second photoelectric transfer element 64, and a switching TFT 69 connected between the output side of the flip-flop memory and the data line 1–1b and having a gate connected to the scanning line 2-1.

The writing operation to the digital memory and the pixel electrode is the same as with the case of the third embodiment, so that the description thereof is omitted herein. Here, however, only the data inputting method will be described.

Now, if the data at a node 80 is denoted by A; the data at a node 32 is denoted by B; the data at a node 67 is denoted by C; the data at a node 68 is denoted by D; and the data at a node 31 is denoted by X, the logical value table is as follows:

TABLE

| A | B | C | D | X(=B*) |
|---|---|---|---|---|
| 0 | 0 | 0 | 1 | 1 |
| 0 | 1 | 1 | 0 | 0 |
| 1 | 0 | 1 | 0 | 1 |
| 1 | 1 | 0 | 1 | 0 |

(*Inversion)

In the above table, A=0 indicates that since the photoelectric transfer element 61 is not irradiated with light, the resistance thereof is high, so that the node 80 is dropped down to the ground potential by the transistor 62. Under these conditions, B*=D can be established. Therefore, when D (data at the node 68) is compared with X (data at the node 31), D is equal to X as D=X.

Then, A=1 indicates that the pixel (the transfer element 61) is irradiated with light. Under these conditions, B=D=X* can be established. Therefore, a polarity opposite to that at the node 31 is developed at the node 68. After that, even if not irradiated with light, data is held in the memory. Therefore, the data at the node 68 is stored in the reading video RAM 72. This stored data is compared with the data written in the node 31 and then stored in the writing video RAM 71 by the comparing circuit 73. By this comparison, it is possible to detect the pixel positions at which the video data change, so that it is possible to input video data in the picture accurately in unit of pixel. Further, when the data stored in the reading video RAM 72 is newly written in the pixel electrode via the data line 1–1a, it is possible to display the input data.

Further, in the case of the input operation, there exists a possibility that the inversion by the light detection and the inversion by the ac driving occur simultaneously so that the input operation cannot be effected accurately. To overcome this problem, it is preferable to determine the light emission of the light pen to be opposite in phase to the ac driving signal.

Further, when the input operation is effected outdoors, since the intensity of the sun light is excessively strong, there exists such a trouble that the input operation may be effected erroneously. To overcome this problem, it is preferable to increase the sensitivity of the photoelectric transfer element in the infrared ray region and further to form the light emitting means (e.g., light pen) by use of an infrared light emitting device.

In the above-mentioned third and sixth embodiments according to the present invention, the liquid crystal display device is of light reflective type structure. Without being limited only thereto, the transmissive type structure can be adopted. However, the liquid crystal display device of reflective type structure is preferable by the following reasons:

For instance, in the case of the liquid crystal display device of light transmissive type structure according to the present invention such that a 6-inch VGA single plate color liquid crystal display panel is formed by use of pMOS TFTs with a channel length L=4.5 µm and a channel width is W=8 µm and nMOS TFTs with a channel length L=6 µm and a channel width is W=8 µm, the aperture ratio is as small as 20%, so that the display is inevitably dark.

On the other hand, in the case of the liquid crystal display device of light reflective type structure according to the present invention such that the pixel electrodes are arranged on the switching TFTs and the polarity switching lines via an insulating substance, since the pixel electrodes can be designed broad without any restriction of the number and the size of pixel elements, it is possible to design the effective aperture ratio as large as 80% or more, so that a bright display can be obtained.

In more detail, as shown by the cross-sectional views in FIG. 13 or 17, since the pixel electrode 3 can be formed over the respective TFTs 22, 23, 24 and 25 and the polarity switching signal lines 26 via an electric insulating layer 401, it is possible to determine the effective area of the pixel electrode 3, without any restriction of the size or the occupancy area corresponding to the total number of elements of the TFTs and the area required for wiring, for each pixel. Therefore, the effective aperture ratio can be increases up to as high as 80% or more, so that a display of a high brightness can be obtained. In addition, in the case of the liquid crystal display device of reflective type structure according to the present invention, since the power consumption can be reduced during the still picture display and further since no back light is required, it is possible to reduce the power consumption of the entire liquid crystal display device markedly, which is particularly suitable for the battery-driven portable data processing apparatus such as note book type personal computer.

Further, in the liquid crystal display device of reflective type structure according to the present invention, since a complicated circuit composed of many TFTs can be formed within one pixel, and further since the power-economizing operation can be effected during the still picture display, without use of any back light, the power consumption can be further reduced, so that the display device according to the present invention is particularly suitable for the battery-driven small-sized portable data terminals. For instance, when the present invention is applied to a 6-inch VGA liquid crystal display panel, the power consumption of the liquid crystal display panel itself can be reduced down to as small as 1 mW or less; that is, a remarkable lower power consumption can be attained for the liquid crystal display device.

What is claimed is:

1. A liquid crystal display device, comprising:

a switch element array substrate having a plurality of data lines and a plurality of scanning lines both arranged being intersected to each other in a matrix form so as to form matrix intersection points of scanning lines and data lines; a plurality of pixel electrodes each arranged for each matrix intersection point; and a plurality of first switching elements each arranged for each matrix intersection point and each turned on or off by the scanning line, for applying write voltage supplied from the data line to the pixel electrode, respectively when turned on;

a counter substrate having a plurality of counter electrodes each arranged being opposed to each pixel electrode with a gap between the two;

a liquid crystal layer sandwiched between the switching element array substrate and the counter substrate;

a plurality of memory elements each interposed between the corresponding first switching element and the corresponding pixel electrode, for holding the write voltage supplied through the data line as data, when the first switching element is turned on;

a plurality of display control lines each arranged in correspondence to each scanning line; and a plurality of second switching elements each arranged for each matrix intersection point, for controlling connection between the pixel electrode and the display control line on the basis of output of the memory element.

2. The liquid crystal display device according to claim 1, wherein:

the display control lines are ac drive signal lines for displaying black and reset signal lines of a predetermined constant potential for displaying white, both in normally white display; and each of the second switching elements is a logic circuit for selecting any one of the ac drive signal line and the reset signal line alternatively on the basis of the output of the memory element, to connect the selected signal line to the pixel electrode.

3. The liquid crystal display device according to claim 2, wherein the potential of a voltage applied to the reset signal line is roughly a mean potential of a voltage applied to the ac drive lines, and the potential of a voltage applied to the counter electrode is the same potential as the voltage applied to the reset signal line.

4. The liquid crystal display device according to claim 2, wherein the pixel electrode is of light reflective type pixel electrode having a light reflective film formed on at least one of the memory element and the second switching element via an electric insulating layer.

5. The liquid crystal display device according to claim 1, which further comprises a liquid crystal driving circuit for selectively supplying a voltage to the data line and the scanning line, respectively to drive the selected pixel electrode via the first switching element, the liquid crystal driving circuit being formed integral with the switching elements on the switching element array substrate by use of material the same as forming at least the switching elements.

6. The liquid crystal display device according to claim 2, which further comprises frequency changing means for reducing frequency of the ac drive signal line when the data lines and the scanning lines are both not designated on the basis of addresses.

7. The liquid crystal display device according to claim 6, wherein the frequency changing means comprises:
   an oscillating circuit;
   a frequency dividing circuit for dividing the frequency of an output signal of the oscillating circuit into a plurality of different frequencies;
   an address signal detecting circuit for detecting address designation operation of the data lines and the scanning lines; and
   switching means for selecting and outputting an ordinary frequency when the addresses are being designated and a lower frequency when the addresses are not being effected, both on the basis of an output of the address signal detecting circuit.

8. A liquid crystal display device, comprising:
   a switch element array substrate having a plurality of data lines and a plurality of scanning lines both arranged being intersected to each other in a matrix form so as to form matrix intersection points; a plurality of pixel electrodes each arranged for each matrix intersection point; a plurality of switching elements each arranged for each matrix intersection point and each turned on or off by the scanning line, for applying write voltage supplied from the data line to the pixel electrode, respectively when turned on; and a data line driving circuit and a scanning line driving circuit each for selectively supplying a voltage to the data line and the scanning line, respectively, to drive the selected pixel electrode via the switching element;
   a counter substrate having a plurality of counter electrodes each arranged being opposed to each pixel electrode with a gap between the two;
   a liquid crystal layer sandwiched between the switching element array substrate and the counter substrate;
   a plurality of memory elements each interposed between the corresponding switching element and the corresponding pixel electrode, for holding the write voltage supplied through the data line as data, when the switching element is turned on;
   polarity inverting means for controlling connection with the pixel electrode on the basis of output of the memory element; and
   a decoder circuit included in at least one of the data driving circuit and the scan driving circuit, for selecting at least one of the data line and the scanning line on the basis of a combination of numerical signals.

9. The liquid crystal display device according to claim 8, which further comprises a data diver circuit for turning on the data line on the basis of a selecting bit output of the decoder circuit of the data driving circuit and for turning off the data line or switching the data line to a high resistance state when the data line is not selected.

10. A liquid crystal display device, comprising:
   a switch element array substrate having a plurality of data lines and a plurality of scanning lines both arranged being intersected to each other in a matrix form so as to form matrix intersection points; a plurality of pixel electrodes each arranged for each matrix intersection point; and a plurality of first switching elements each arranged for each matrix intersection point and each turned on or off by the scanning line, for applying write voltage supplied from the data line to the pixel electrode, respectively when turned on;
   a counter substrate having a plurality of counter electrodes each arranged being opposed to each pixel electrode with a gap between the two;
   a liquid crystal layer sandwiched between the switching element array substrate and the counter substrate;
   a plurality of memory elements of flip-flop structure each interposed between the corresponding first switching element and the corresponding pixel electrode, for holding the write voltage supplied through the data line as data, when the first switching element is turned on;
   a plurality of polarity switching signal lines each arranged in correspondence to the scanning line, to which potential inverted voltage is applied for each predetermined time period; and
   a plurality of second switching elements each for supplying the data held by the memory element to the pixel electrode by switching the polarity thereof in response to a polarity switching signal applied to the polarity switching signal line.

11. The liquid crystal display device according to claim 10, wherein the digital memory element is composed of two cross-connected inverter circuits each made up of two transistors, seven transistors in total of the digital memory elements of four transistors, the first switching element of one transistor, and the second switching element of two opposite-polarity transistors being all arranged for each pixel electrode.

12. The liquid crystal display device according to claim 10, wherein the pixel electrode is of light reflective type pixel electrode having a light reflective film formed on at least the digital memory element and the second switching element via an electric insulating layer.

13. The liquid crystal display device according to claim 10, which further comprises a liquid crystal driving circuit for selectively supplying a voltage to the data line and the scanning line, respectively to drive the selected pixel electrode via the first switching element, the liquid crystal driving circuit being formed integral with the switching elements on the switching element array substrate by use of material the same as forming at least the switching elements.

14. The liquid crystal display device according to claim 13, wherein in the liquid crystal driving circuit, a plurality of shift registers are arranged in an array form, and each output stage of the shift registers is connected one by one to at least one of the scanning line and the data line.

15. The liquid crystal display device according to claim 13, wherein the liquid crystal driving circuit comprises a decoder circuit for selecting any line of at least either one of the data lines and the scanning lines on the basis of a combination of numerical signals indicative of only an address of a pixel at which an image changes.

16. The liquid crystal display device according to claim 10, wherein the relationship of gate turn-on drive capability of the respective switching elements is set to G1>G2>G3, where G1 denotes the gate turn-on drive capability of the switching elements connected to the scanning line and the data line, G2 denotes the gate turn-on drive capability of the respective switching elements for forming the digital memory cell element; and G3 denotes the gate turn-on drive capability of a pair of the switching elements.

17. The liquid crystal display device according to claim 10, wherein the respective switching elements are formed as a thin film transistors, respectively.

18. A liquid crystal display device, comprising: a switch element array substrate having a plurality of data lines and a plurality of scanning lines both arranged being intersected to each other in a matrix form so as to form matrix intersection points; a plurality of pixel electrodes each arranged for each matrix intersection point; and a plurality of first switching elements each arranged for each matrix intersection point and each turned on or off by the scanning line, for applying write voltage supplied from the data line to the pixel electrode, respectively when turned on;

a counter substrate having a plurality of counter electrodes each arranged being opposed to each pixel electrode with a gap between the two;

a liquid crystal layer sandwiched between the switching element array substrate and the counter substrate;

a plurality of memory elements each interposed between the corresponding first switching element and the corresponding pixel electrode, for holding the write voltage supplied through the data line as data, when the first switching element is turned on;

a plurality of display control lines each arranged in correspondence to each scanning line;

a plurality of second switching elements each arranged for each matrix intersection point, for controlling connection between the pixel electrode and the display control line on the basis of output of the memory element; and a plurality of photoelectric transfer elements each one end terminal of which is connected to an input side of the memory element.

* * * * *